(12) United States Patent
Silverstein et al.

(10) Patent No.: US 7,891,816 B2
(45) Date of Patent: Feb. 22, 2011

(54) STEREO PROJECTION USING POLARIZED SOLID STATE LIGHT SOURCES

(75) Inventors: Barry D. Silverstein, Rochester, NY (US); Joseph R. Bietry, Rochester, NY (US); James R. Kircher, Mendon, NY (US); Robert Metzger, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 557 days.

(21) Appl. No.: 12/036,385

(22) Filed: Feb. 25, 2008

(65) Prior Publication Data

US 2009/0213330 A1 Aug. 27, 2009

(51) Int. Cl.
- G03B 21/00 (2006.01)
- G03B 21/14 (2006.01)
- G02B 27/26 (2006.01)
- H04N 13/04 (2006.01)
- H04N 9/47 (2006.01)

(52) U.S. Cl. .................. 353/8; 353/7; 353/20; 359/465; 348/51; 348/57; 348/58

(58) Field of Classification Search .................. 353/7–8, 353/10, 20, 30–31, 81, 85, 122; 359/1, 15, 359/27–28, 458, 462, 464–467; 348/42, 348/51, 54–55, 57–58, 60; 349/8–9, 15
See application file for complete search history.

(56) References Cited

U.S. PATENT DOCUMENTS

| | | | |
|---|---|---|---|
| 4,441,791 A | 4/1984 | Hornbeck | |
| 5,535,047 A | 7/1996 | Hornbeck | |
| 5,564,810 A * | 10/1996 | Larson | ........................... 353/8 |
| 5,600,383 A | 2/1997 | Hornbeck | |
| 5,808,795 A | 9/1998 | Shimomura et al. | |
| 5,907,437 A | 5/1999 | Sprotbery et al. | |
| 5,921,650 A * | 7/1999 | Doany et al. | ................... 353/31 |
| 5,993,004 A * | 11/1999 | Moseley et al. | ................. 353/8 |
| 6,186,629 B1 | 2/2001 | Iwamura et al. | |
| 6,240,116 B1 | 5/2001 | Lang et al. | |
| 6,280,034 B1 * | 8/2001 | Brennesholtz | ................ 353/20 |
| 6,594,090 B2 | 7/2003 | Kruschwitz et al. | |
| 6,747,781 B2 * | 6/2004 | Trisnadi | ..................... 359/279 |
| 6,768,585 B2 * | 7/2004 | Agostinelli et al. | ......... 359/466 |
| 6,793,341 B2 | 9/2004 | Svardal et al. | |
| 7,325,939 B2 | 2/2008 | Wilson et al. | |

(Continued)

*Primary Examiner*—Georgia Y Epps
*Assistant Examiner*—Jori S Reilly-Diakun
(74) *Attorney, Agent, or Firm*—Peyton C. Watkins

(57) ABSTRACT

A stereoscopic digital image projector includes (a) a plurality of light modulation assemblies, each comprising: (i) at least one solid-state light source energizable to provide illumination having a first polarization axis; (ii) a polarization rotator disposed in the path of the polarized illumination from the solid-state light source(s) and actuable to controllably rotate the polarization axis from the solid-state light source(s) to a second polarized axis; (iii) a micro-electromechanical spatial light modulator in the path of the polarized illumination and energizable to modulate the polarized illumination to form a first modulated light from illumination of the first polarization state and to form a second modulated light from illumination of the second polarization state; and (b) a synchronizing means to temporally control the polarization rotation to match the appropriate image data on the spatial light modulator; and (c) projection optics for directing the first and second modulated light toward a display surface.

25 Claims, 24 Drawing Sheets

U.S. PATENT DOCUMENTS

| | | |
|---|---|---|
| 7,360,899 B2 | 4/2008 | McGuire et al. |
| 7,419,265 B2 * | 9/2008 | Relke et al. .................... 353/7 |
| 7,422,329 B2 | 9/2008 | Berman |
| 7,764,724 B2 * | 7/2010 | Peterson .................... 372/108 |
| 2004/0239880 A1 * | 12/2004 | Kapellner et al. ............ 353/20 |
| 2005/0219469 A1 | 10/2005 | Chan et al. |
| 2006/0038964 A1 | 2/2006 | Lu et al. |
| 2006/0291053 A1 | 12/2006 | Robinson et al. |
| 2007/0127121 A1 | 6/2007 | Maximus et al. |
| 2007/0132953 A1 | 6/2007 | Silverstein |
| 2007/0139769 A1 * | 6/2007 | DeCusatis et al. ........... 359/478 |
| 2009/0096990 A1 * | 4/2009 | Chien et al. .................... 353/8 |
| 2009/0153752 A1 * | 6/2009 | Silverstein ................. 348/750 |
| 2009/0190095 A1 * | 7/2009 | Ellinger et al. ................. 353/7 |
| 2009/0213330 A1 * | 8/2009 | Silverstein et al. ............. 353/8 |
| 2009/0231697 A1 * | 9/2009 | Marcus et al. ............. 359/465 |
| 2009/0278918 A1 * | 11/2009 | Marcus et al. ................ 348/54 |
| 2009/0284713 A1 * | 11/2009 | Silverstein et al. ............. 353/8 |
| 2010/0007852 A1 * | 1/2010 | Bietry et al. .................... 353/8 |
| 2010/0103519 A1 * | 4/2010 | Silverstein et al. ......... 359/487 |

\* cited by examiner

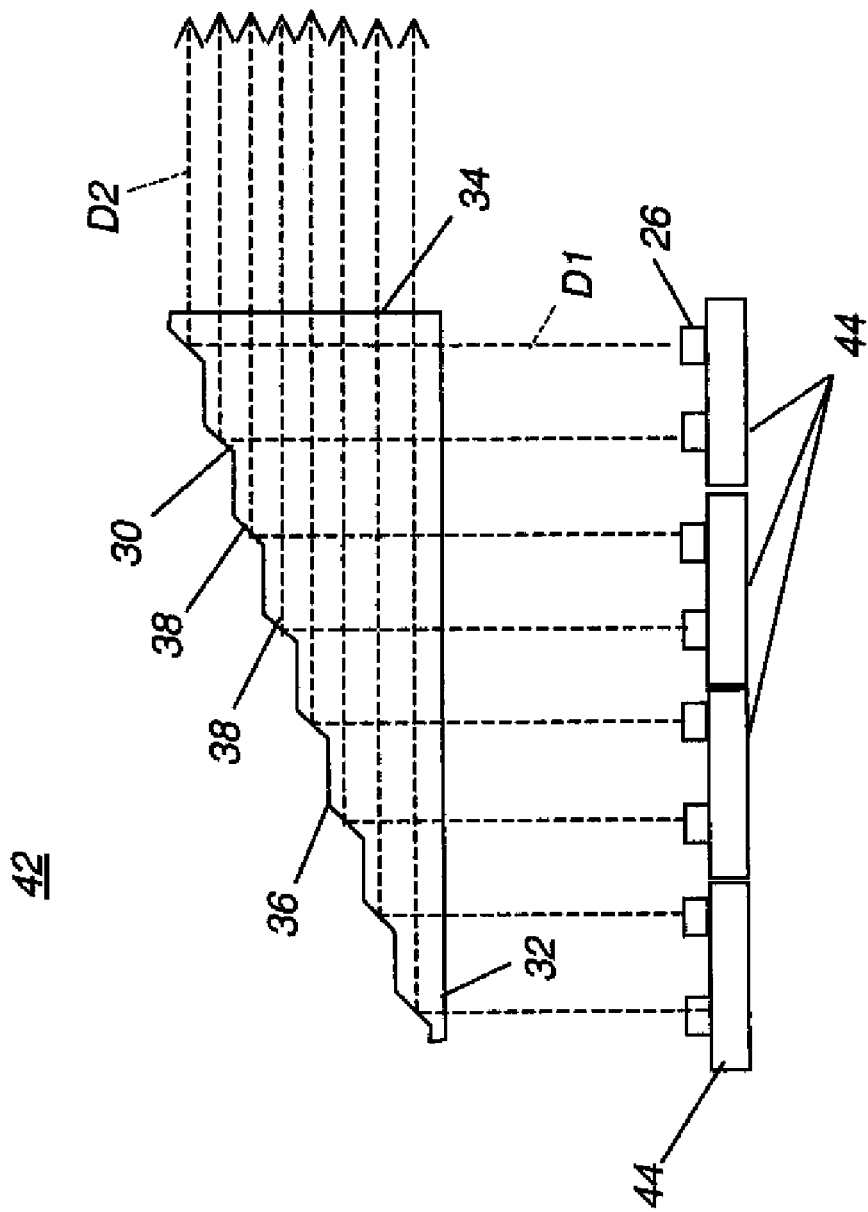

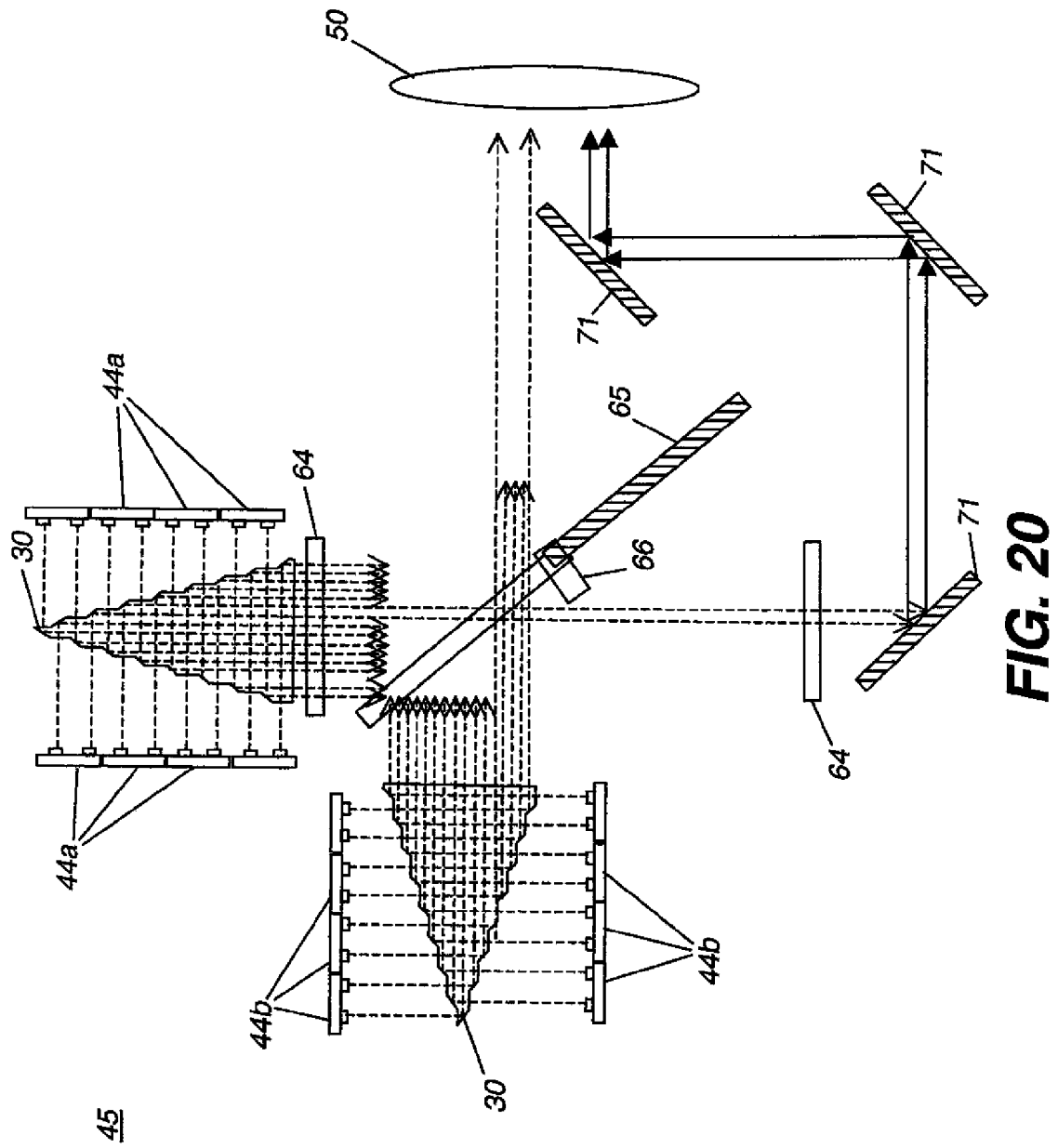

STEREO PROJECTION USING POLARIZED SOLID STATE LIGHT SOURCES

CROSS REFERENCE TO RELATED APPLICATIONS

The present invention is related to the commonly assigned U.S. patent application Ser. No. 11/937,729, filed Nov. 9, 2007, entitled "Projection Apparatus Using Solid-State Light Source Array" by Barry D. Silverstein et al.

FIELD OF THE INVENTION

This invention generally relates to an apparatus for projecting a stereoscopic digital image and more particularly relates to an improved apparatus and method using polarized solid state lasers to create stereoscopic images for digital cinema projection.

BACKGROUND OF THE INVENTION

There is growing interest in high-quality projection systems that display three-dimensional (3D) or perceived stereoscopic content in order to offer consumers an enhanced visual experience in large venues. Although a number of entertainment companies have offered stereoscopic content in theaters, theme parks, and other venues, these companies have primarily employed film media for stereoscopic image presentation. To create the stereo image, two sets of films are loaded to two separate projection apparatus, one for each eye. Left- and right-eye images are then simultaneously projected using polarized light. One polarization is used for the image presented to the left eye; light of the orthogonal polarization is then used for the image presented to the right eye. Audience members wear corresponding orthogonally polarized glasses that block one polarized light image for each eye while transmitting the orthogonal polarized light image.

In the ongoing transition of the motion picture industry to digital imaging, some vendors, such as Imax, have continued to utilize a two-projection system to provide a high quality stereo image. More commonly, however, conventional projectors have been modified to enable 3D projection.

The most promising of these conventional projection solutions for multicolor digital cinema projection employ, as image forming devices, one of two basic types of spatial light modulators (SLMs). The first type of spatial light modulator is the Digital Light Processor (DLP) a digital micromirror device (DMD), developed by Texas Instruments, Inc., Dallas, Tex. DLPs have been successfully employed in digital projection systems. DLP devices are described in a number of patents, for example U.S. Pat. No. 4,441,791; U.S. Pat. No. 5,535,047; U.S. Pat. No. 5,600,383 (all to Hornbeck).

FIG. 1 shows a simplified block diagram of a projector apparatus 10 that uses DLP spatial light modulators. A light source 12 provides polychromatic unpolarized light into a prism assembly 14, such as a Philips prism, for example. Prism assembly 14 splits the polychromatic light into red, green, and blue component wavelength bands and directs each band to the corresponding spatial light modulator 20r, 20g, or 20b. Prism assembly 14 then recombines the modulated light from each SLM 20r, 20g, and 20b and provides this unpolarized light to a projection lens 29 for projection onto a display screen or other suitable surface.

DLP-based projectors demonstrate the capability to provide the necessary light throughput, contrast ratio, and color gamut for most projection applications from desktop to large cinema. However, there are inherent resolution limitations, with existing devices typically providing no more than 2148× 1080 pixels. In addition, high component and system costs have limited the suitability of DLP designs for higher-quality digital cinema projection. Moreover, the cost, size, weight, and complexity of the Philips prism or other suitable combining prisms are significant constraints. In addition, the need for a relatively fast projection lens with a long working distance, due to brightness requirements, negatively impacts the acceptability and usability of these devices.

The second type of spatial light modulator used for digital projection is the LCD (Liquid Crystal Device). The LCD forms an image as an array of pixels by selectively modulating the polarization state of incident light for each corresponding pixel. LCDs appear to have some advantages as spatial light modulators for high-quality digital cinema projection systems. These advantages include relatively large device size, favorable device yields and the ability to fabricate higher resolution devices, for example 4096×2160 resolution devices available from Sony and JVC Corporations. Among examples of electronic projection apparatus that utilize LCD spatial light modulators are those disclosed in U.S. Pat. No. 5,808,795 (Shimomura et al.) and elsewhere. LCOS (Liquid Crystal On Silicon) devices are thought to be particularly promising for large-scale image projection. However, with LCD components it can be difficult to maintain the high quality demands of digital cinema, particularly with regard to color and contrast, since the high thermal load of high brightness projection affects polarization qualities of these devices.

Conventional methods for forming stereoscopic images from these conventional micro-display (DLP or LCOS) based projectors use either of two primary techniques to distinguish between the left and right eye content. One less common technique, utilized by Dolby Laboratories, for example, uses color space separation, as described in US Patent Application Publication No. 2007/0127121 by Maximus et. al. and elsewhere. Filters are utilized in the white light illumination system to momentarily block out portions of each of the primary colors for a portion of the frame time. For example, for the left eye, the lower wavelength spectrum of Red, Blue, and Green (RGB) is blocked for a period of time. This alternates with blocking the higher wavelength spectrum of Red, Blue, and Green (RGB) for the other eye. The appropriate color adjusted stereo content that is associated with each eye is then presented to each modulator for the eye. The viewer wears a corresponding filter set that similarly transmits only one of the two 3-color (ROB) spectral sets. The color separation approach enjoys some advantages over a polarization based projection approach. For example, images can be projected onto most screens without the requirement to use a more expensive polarization-maintaining screen. There are also disadvantages, however. The needed glasses are expensive. Viewing quality can be reduced by normal angular shift, head motion, and tilt. Additionally, adjustment of the color space can be difficult and there can be significant light loss due to filtering. Because of this, a higher lamp output may be needed or output image brightness reduced.

The second method for forming stereoscopic images uses polarized light. In the example embodiment of U.S. Pat. No. 6,793,341 to Svardal et al. and elsewhere, each of two orthogonal polarization states is delivered to a corresponding one of two separate spatial light modulators. Polarized light from both modulators is then projected simultaneously. The viewer wears polarized glasses with polarization transmission axes for left and right eyes orthogonally oriented with respect to each other. Although this arrangement offers efficient use of light, it can be an expensive configuration. This can be particularly true in projector designs that require a spatial light modulator for each color band.

Another approach, commercialized by Real-D, Beverly Hills, Calif., uses a conventional projector modified to modulate alternate polarization states that are rapidly switched from one to the other. This can be done, for example, where a DLP projector has a polarizer placed in the output path of the light, such as at a position 16 indicated by a dashed line in FIG. 1. The polarizer is required, since the DLP is not inherently designed to maintain the polarization of the input light, which is generally unpolarized, as the window of the device package depolarizes due to stress induced birefringence. An achromatic polarization switcher, similar to the type described in US application 2006/0291053 by Robinson et al. could be disposed at position 16 after the polarizer. A switcher of this type alternately rotates polarized light between two orthogonal polarization states, such as linear polarization states, to allow the presentation of two distinct images, one to each eye, while the user views with polarized glasses.

Real-D systems historically have utilized left and right circularly polarized light, where the glasses are made of a combination ¼ wave retarder plus a polarizer to change the circularly polarized light back to linearly polarized light before blocking one state. This arrangement appears to be less sensitive to head tilt and the achromatic polarization switcher is easier to fabricate. The glasses, however, add expense over embodiments that simply use a polarizer. In either case, the display screen must substantially maintain the polarization state of the incident image-bearing light and is, therefore, typically silvered. With such MEMS based systems, there can be significant light loss, resulting from the requirement to use polarized light, which can reduce output light by half over conventional non-stereoscopic designs. There is additional cost due to the large polarization switcher as well as the alignment features and mounting to the front of the projections system. This system must be flexible in order to accommodate the variety of projectors that may be retrofitted. The polarization switcher design is also more complicated in that it must essentially handle the entire visible spectral band, retarding the light in equal amounts regardless of the wavelength. Failure to properly achieve this performance can generate unacceptable crosstalk, directing images to the wrong eye and reducing the quality of the stereoscopic effect. This type of crosstalk effect can even be physically disturbing to the viewer, in some cases.

Thus, by comparison, LCOS-based projectors are advantaged in that the output is typically already polarized in most configurations.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image. Numerically, etendue is proportional to the product of two factors, namely the image area and the numerical aperture. In terms of the simplified optical system represented in FIG. 2 having light source 12, optics 18, and a spatial light modulator 20, etendue is a product of the area of the light source A1 and its output angle θ1 and, in a well-matched optical system, this is equal to the product of the area of the modulator A2 and its acceptance angle θ2. For increased brightness, it is desirable to provide as much light as possible from the area of light source 12. As a general principle, the optical design is advantaged when the etendue at the light source is most closely matched to the etendue at the modulator.

Increasing the numerical aperture, for example, increases etendue so that the optical system captures more light. Similarly, increasing the source image size, so that light originates over a larger area, increases etendue. In order to utilize an increased etendue on the illumination side, the etendue must be greater than or equal to that of the illumination source. Larger image sizes, however, typically result in a more costly system. This is especially true of devices such as LCOS and DLP components, where the silicon substrate and defect potential increase with size. As a general rule, increased etendue results in a more complex and costly optical design. Using a conventional approach such as that outlined in U.S. Pat. No. 5,907,437 (Sprotbery et al.) for example, lens components in the optical system must be designed for large etendue. The source image area for the light that must be converged through system optics is the sum of the combined areas of the spatial light modulators in red, green, and blue light paths; notably, this is three times the area of the final multicolor image formed. That is, for the configuration disclosed in such a conventional approach, optical components handle a sizable image area, therefore a high etendue, since red, green, and blue color paths are separate and must be optically converged. Moreover, although a configuration such as that disclosed in the '437 Sprotbery et al. disclosure handles light from three times the area of the final multicolor image formed, this configuration does not afford any benefit of increased brightness, since each color path contains only one-third of the total light level.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

The goal of providing sufficient brightness for digital cinema applications at an acceptable system cost has eluded designers of both LCD and DLP systems. LCD-based systems have been compromised by the requirement for polarized light, reducing efficiency and increasing etendue, even where polarization recovery techniques are used. DLP device designs, not requiring polarized light, have proven to be somewhat more efficient, but still require expensive, short lived lamps and costly optical engines, making them too expensive to compete against conventional cinema projection equipment.

In order to compete with conventional high-end, film-based projection systems and provide what has been termed electronic or digital cinema, digital projectors must be capable of achieving comparable cinema brightness levels to this earlier equipment. As some idea of scale, the typical theatre requires on the order of 10,000 lumens projected onto screen sizes on the order of 40 feet in diagonal. The range of screens requires anywhere from 5,000 lumens to upwards of 40,000 lumens. In addition to this demanding brightness requirement, these projectors must also deliver high resolution (2048×1080 pixels) and provide around 2000:1 contrast and a wide color gamut.

Some digital cinema projector designs have proved to be capable of this level of performance. However, high equipment cost and operational costs have been obstacles. Projection apparatus that meet these requirements typically cost in excess of $50,000 each and utilize high wattage Xenon arc lamps that need replacement at intervals between 500-2000 hours, with typical replacement cost often exceeding $1000. The large etendue of the Xenon lamp has considerable impact on cost and complexity, since it necessitates relatively fast optics to collect and project light from these sources.

One drawback common to both DLP and LCOS LCD spatial light modulators (SLM) has been their limited ability to use solid-state light sources, particularly laser sources. Although they are advantaged over other types of light sources with regard to relative spectral purity and potentially high brightness levels, solid-state light sources require different approaches in order to use these advantages effectively. Conventional methods and devices for conditioning, redirecting, and combining light from color sources, used with earlier digital projector designs, can constrain how well laser light sources are used.

Solid-state lasers promise improvements in etendue, longevity, and overall spectral and brightness stability but, until recently, have not been able to deliver visible light at sufficient levels and at costs acceptable for digital cinema. In a more recent development, laser arrays have been commercialized and show some promise as potential light sources. However, brightness itself is not yet high enough; the combined light from as many as 9 individual arrays is needed in order to provide the necessary brightness for each color.

Laser arrays of particular interest for projection applications include various types of VCSEL arrays, including VECSEL (Vertical Extended Cavity Surface-Emitting Laser) and NECSEL (Novalux Extended Cavity Surface-Emitting Laser) devices from Novalux, Sunnyvale, Calif. However, conventional solutions using these devices have been prone to a number of problems. One limitation relates to device yields. Due largely to heat and packaging problems for critical components, the commercialized VECSEL array is extended in length, but limited in height; typically, a VECSEL array has only two rows of emitting components. The use of more than two rows tends to increase yield difficulties dramatically. In addition, conventional VECSEL designs are prone to difficulties with power connection and heat sinking. These lasers are of high power; for example, a single row laser device, frequency doubled into a two row device by Novalux, produces over 3 W of usable light. Thus, there can be significant current requirements and heat load from the unused current. Lifetime and beam quality is highly dependent upon stable temperature maintenance.

Coupling of the laser sources to the projection system presents another difficulty that is not adequately addressed using conventional approaches. For example, using Novalux NESEL lasers, approximately nine 2 row by 24 laser arrays are required for each color in order to approximate the 10,000 lumen requirement of most theatres. It is desirable to separate these sources, as well as the electronic delivery and connection and the associated heat from the main thermally sensitive optical system to allow optimal performance of the projection engine. Other laser sources are possible, such as conventional edge emitting laser diodes. However, these are more difficult to package in array form and traditionally have a shorter lifetime at higher brightness levels.

Thus, it can be seen that the challenge of providing a stereoscopic color projection system having cinema or near-cinema performance and brightness has not been met using conventional approaches. There is a need for an illumination solution that enables polarized light to be provided for stereoscopic modulation at the brightness levels needed for high-end projection systems.

SUMMARY OF THE INVENTION

It is an object of the present invention to address the need for stereoscopic imaging with a MEMS based digital spatial light modulators such as DLP and related microdisplay spatial light modulator devices. With this object in mind, the present invention provides A stereoscopic digital image projector comprising (a) a plurality of light modulation assemblies, each comprising: (i) at least one solid-state light source energizable to provide illumination having a first polarization axis; (ii) a polarization rotator disposed in the path of the polarized illumination from the solid-state light source(s) and actuable to controllably rotate the polarization axis from the solid-state light source(s) to a second polarized axis; (iii) a micro-electromechanical spatial light modulator in the path of the polarized illumination and energizable to modulate the polarized illumination to form a first modulated light from illumination of the first polarization state and to form a second modulated light from illumination of the second polarization state; and (b) a synchronizing means to temporally control the polarization rotation to match the appropriate image data on the spatial light modulator; and (c) projection optics for directing the first and second modulated light toward a display surface.

It is a feature of the present invention that it provides ways for improved etendue matching between illumination and modulation components.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 9A is a schematic side-view diagram showing the use of a light-redirecting prism for combining illumination from multiple solid-state light arrays in one embodiment;

FIG. 20 is a schematic of an embodiment of a recycling illumination system that alternately converts light to two orthogonal polarization states;

DETAILED DESCRIPTION OF THE INVENTION

The present description is directed in particular to elements forming part of, or cooperating more directly with, an apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation.

Embodiments of the present invention address the need for improved brightness in a stereoscopic viewing system using alternately illuminated orthogonal polarized laser light sources and provide solutions that can also allow ease of removal and modular replacement of laser assemblies. Embodiments of the present invention additionally provide features that reduce thermal effects that might otherwise cause thermally induced stress birefringence in optical components that are used with polarization based projectors. Embodiments of the present invention take advantage of the inherent polarization of light that is emitted from a VECSEL laser array or other type of solid-state light array.

Figure 1:
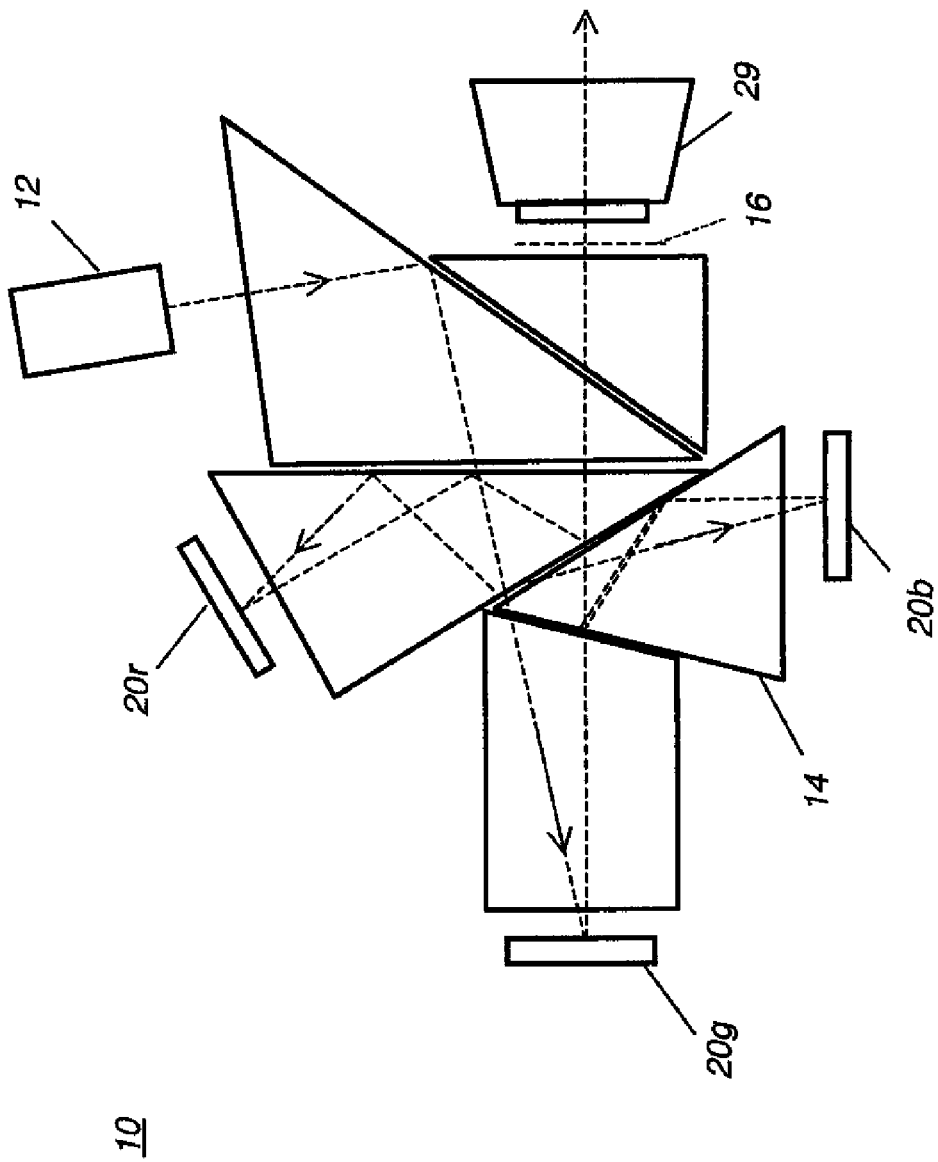
FIG. 1 is a schematic block diagram of a conventional projection apparatus using a combining prism for the different color light paths.
Figure 2:
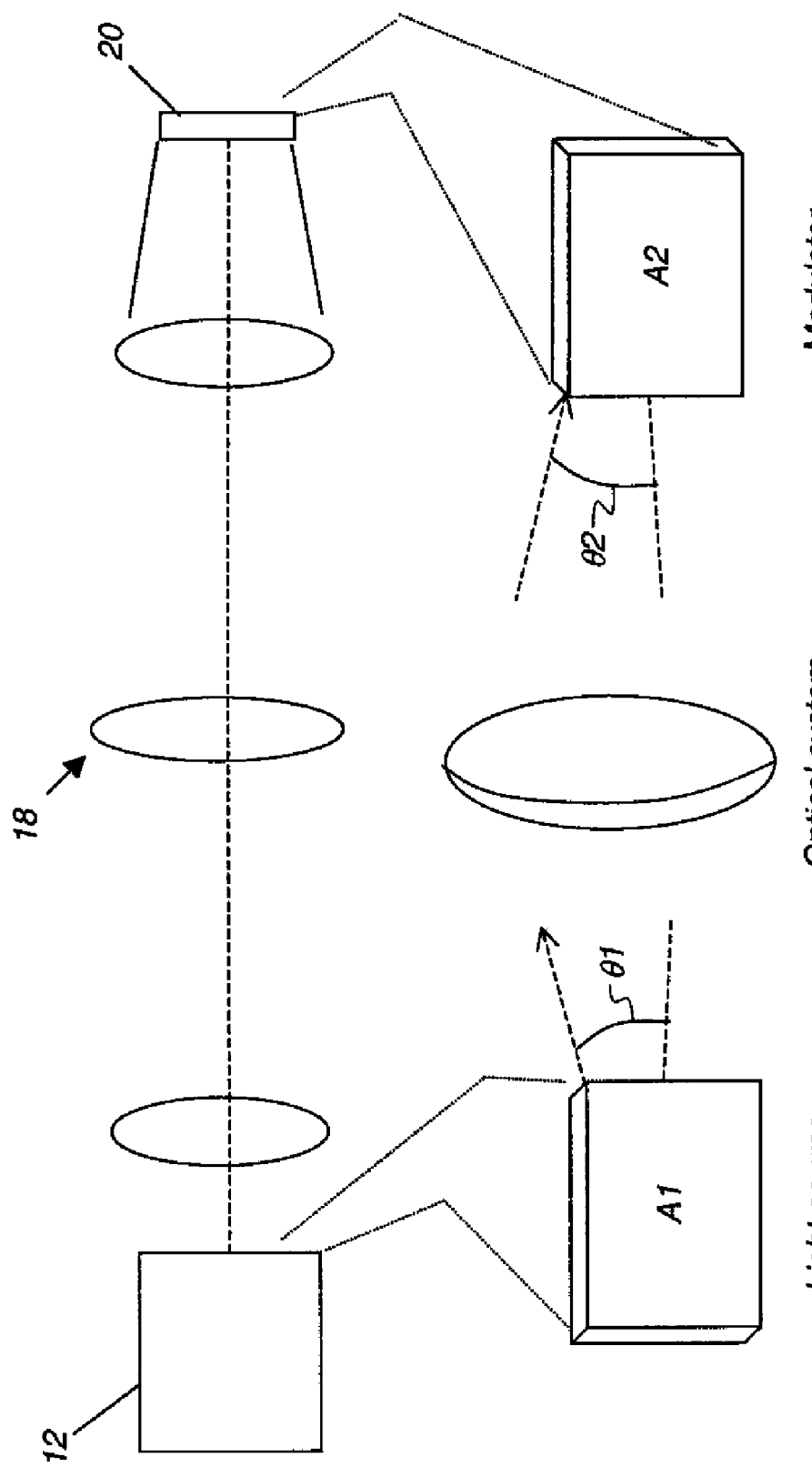
FIG. 2 is a representative diagram showing etendue for an optical system.
Figure 3B:
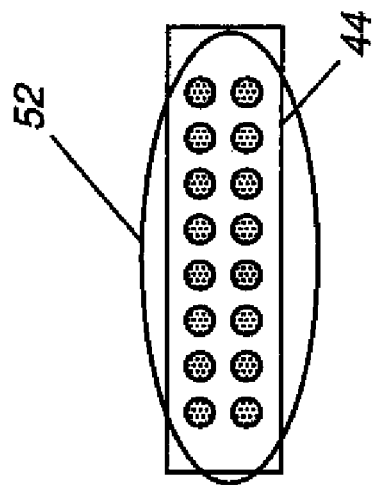
FIGS. 3A and 3B are plan views showing the relative fill factor of different solid-state light array and light combiner arrangements.
Figure 3A:
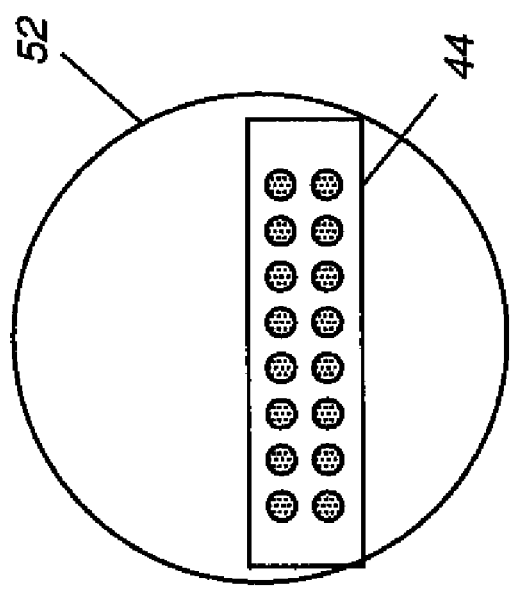

One approach used to reduce thermal loading by embodiments of the present invention is to isolate the light sources from light modulation components using a waveguide structure. Light from multiple solid-state light source arrays is coupled into polarization maintaining optical waveguides that deliver the light to the modulation device. When this is done, the geometry of the light source-to-waveguide interface can be optimized so that the waveguide output is well-matched to the aspect ratio of the spatial light modulator. In practice, this means that the waveguide aperture is substantially filled or slightly underfilled for maintaining optimal etendue levels. This arrangement also helps to minimize the speed requirement of illumination optics. Referring to FIGS. 3A and 3B, the input aperture of a light guide 52 is shown in cross section. A solid-state light array 44 is shown as it would appear at the input aperture of light guide 52, if properly scaled. As shown in FIG. 3A, the aperture is underfilled, which may easily cause a poor etendue match at the spatial light modulator end of light guide 52. In FIG. 3B, the aspect ratios of array 44 and light guide 52 are well matched by reshaping the input aperture of light guide 52 from its conventional circular form. In yet other arrangements not shown in FIG. 3A or 3B, multiple arrays 44 can be combined in order to effectively form a larger array. Methods of combining multiple arrays 44 are described in more detail subsequently.

In embodiments using this approach, an optical fiber can be utilized for light guide 52. In one embodiment, a rectangular core optical fiber is used. For example, rectangular core fiber from Liekki of Lohaja, Finland has been fabricated to better match source aspect ratios.

Figure 4:
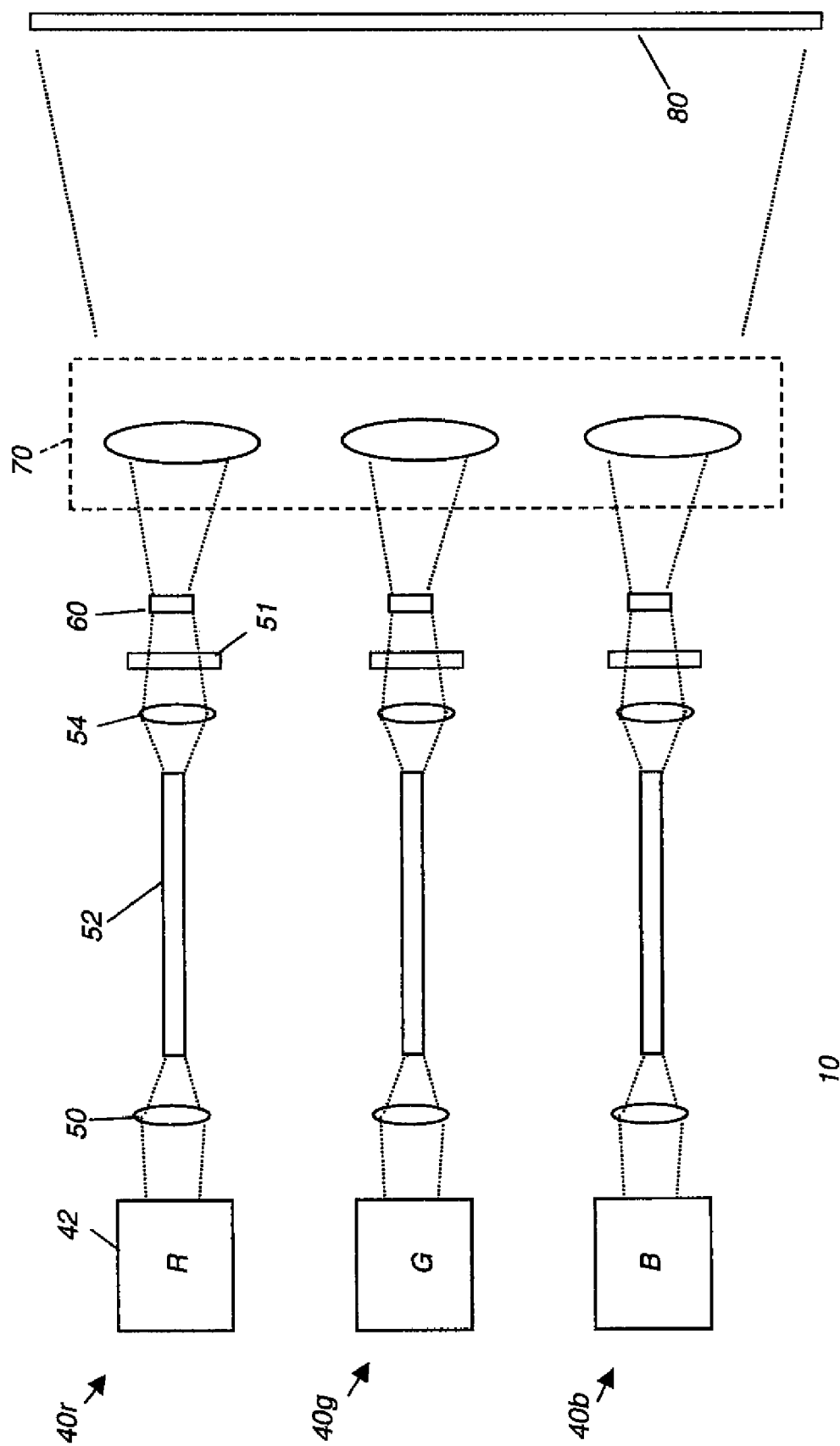
FIG. 4 is a schematic block diagram showing the general arrangement of a projection apparatus using an illumination combiner for stereo image projection.

In order to better understand the present invention, it is instructive to describe the overall context within which apparatus and methods of the present invention can be operable. The schematic diagram of FIG. 4 shows a basic arrangement for projection apparatus 10 that is used in a number of embodiments of the present invention. Three light modulation assemblies 40r, 40g, and 40b are shown, each modulating one of the primary Red, Green, or Blue (RGB) colors from an illumination combiner 42. In each light modulation assembly 40r, 40g, and 40b, an optional lens 50 may direct light into an optional polarization maintaining light guide 52. At the output of light guide 52, or otherwise receiving light from lens 50, a lens 54 then directs light through an integrator 51, such as a fly's eye integrator or integrating bar, for example. This light goes to a spatial light modulator 60. Spatial light modulator 60 is a micro-electromechanical systems (MEMS) device, such as a DLP or other type of reflective MEMS component, including any of the types of MEMS modulator components that modulate light by reflection or by diffraction. These devices can be considered as "polarization state neutral", since they do not modulate light at each pixel by modulating the polarization state of the pixel; any change to the polarization state of the incident light for any pixel is inadvertent, a function of its incident angle when reflected from the MEMS surfaces for that pixel. The incident angle of light to the MEMS spatial light modulator can be adjusted to minimize any unwanted polarization effects, as described subsequently. For embodiments of the present invention, the modulator must take light of two orthogonal input polarization states and output light of two orthogonal polarization states that correspond to the respective input states. The output polarization states may, however, be rotated with respect to the input states.

Projection optics 70, indicated generally in a dashed outline in FIG. 4 due to its many possible embodiments, then direct the modulated light to a display surface 80. The overall arrangement shown in FIG. 4 is then used for subsequent embodiments of the present invention, with various arrangements used for illumination combiner 42. In some embodiments, illumination from any of light modulation assemblies 40r, 40g, and 40b may be directed to an integrator 51 without the use of light guide 52. Light modulation assemblies 40r,

40g, and 40b then deliver polarized light to a polarization state neutral spatial light modulator 60 and subsequently to projection lens 70.

Figure 5:
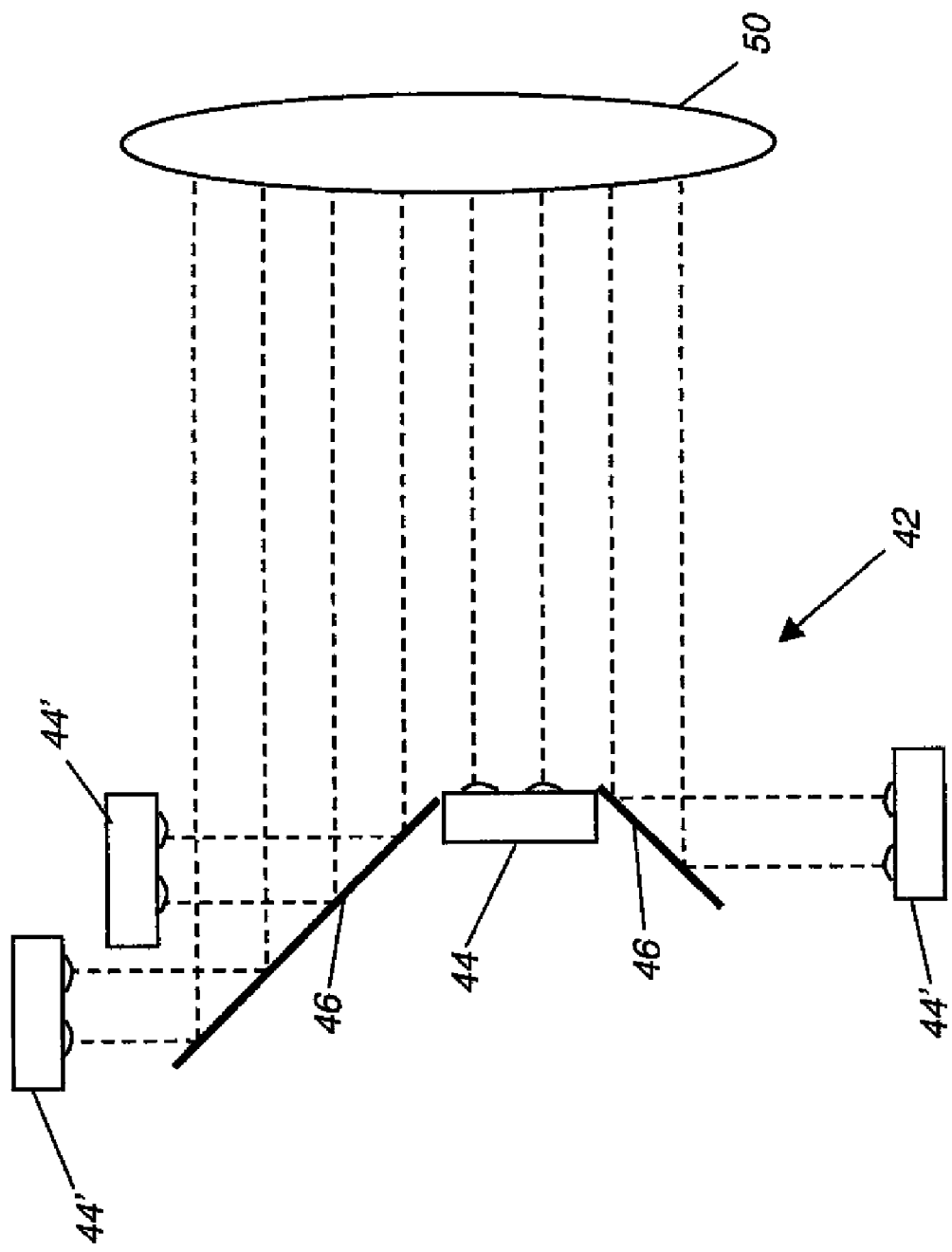
FIGS. 5 and 6 are schematic side-view diagrams showing how polarized light from multiple solid-state light arrays can be provided along the same illumination path.
Figure 6:
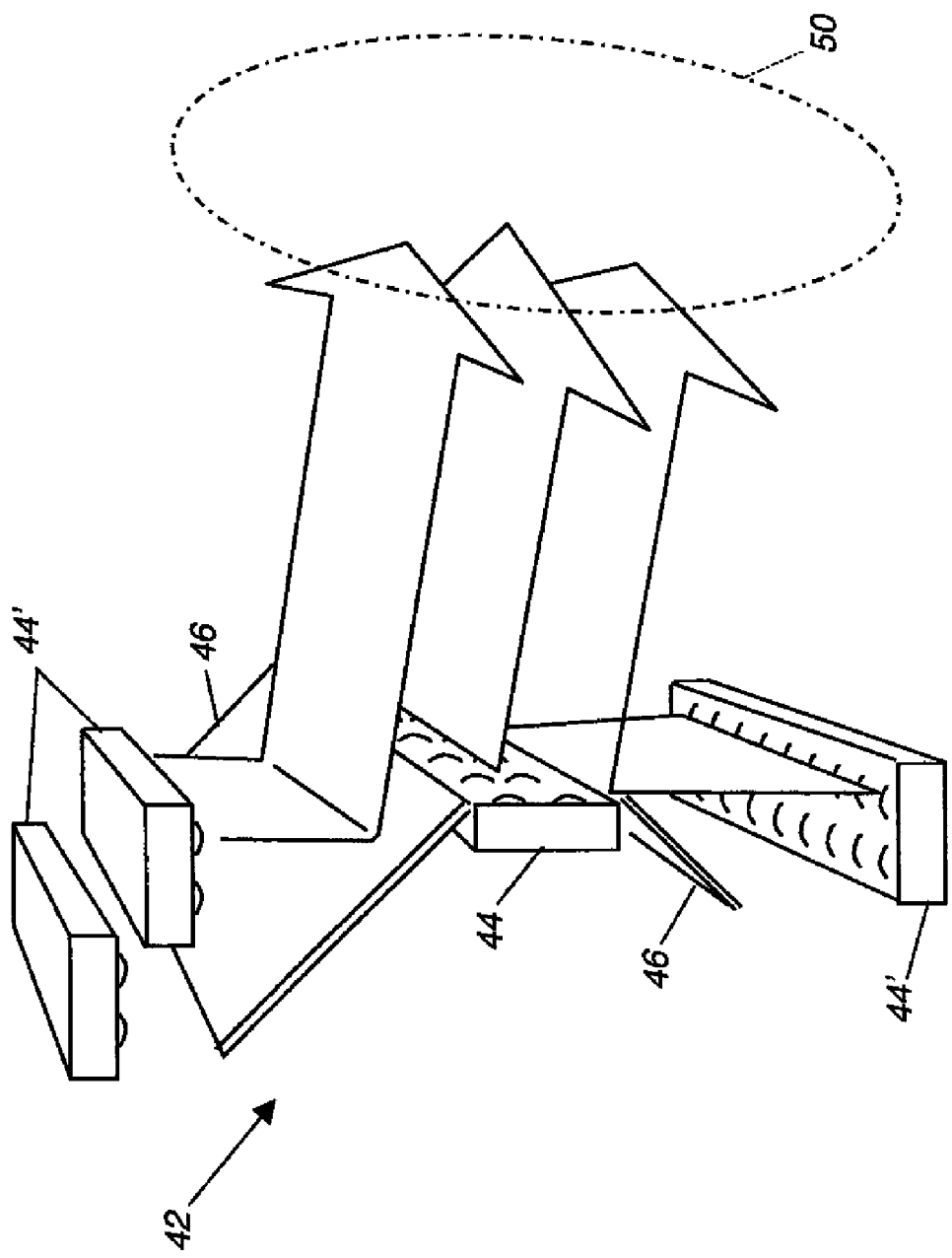

FIG. 5 shows one approach for combining multiple arrays 44 and 44' to form a larger array. FIG. 6 shows the configuration of FIG. 5 in perspective view. In FIG. 5, one or more interspersed mirrors 46 may be used to place the optical axis of additional arrays 44' in line with array 44 to provide the arrangement shown in cross-section in FIG. 3b. However, it can be appreciated that heat and spacing requirements may limit how many arrays 44 can be stacked in this manner.

Figure 7A:
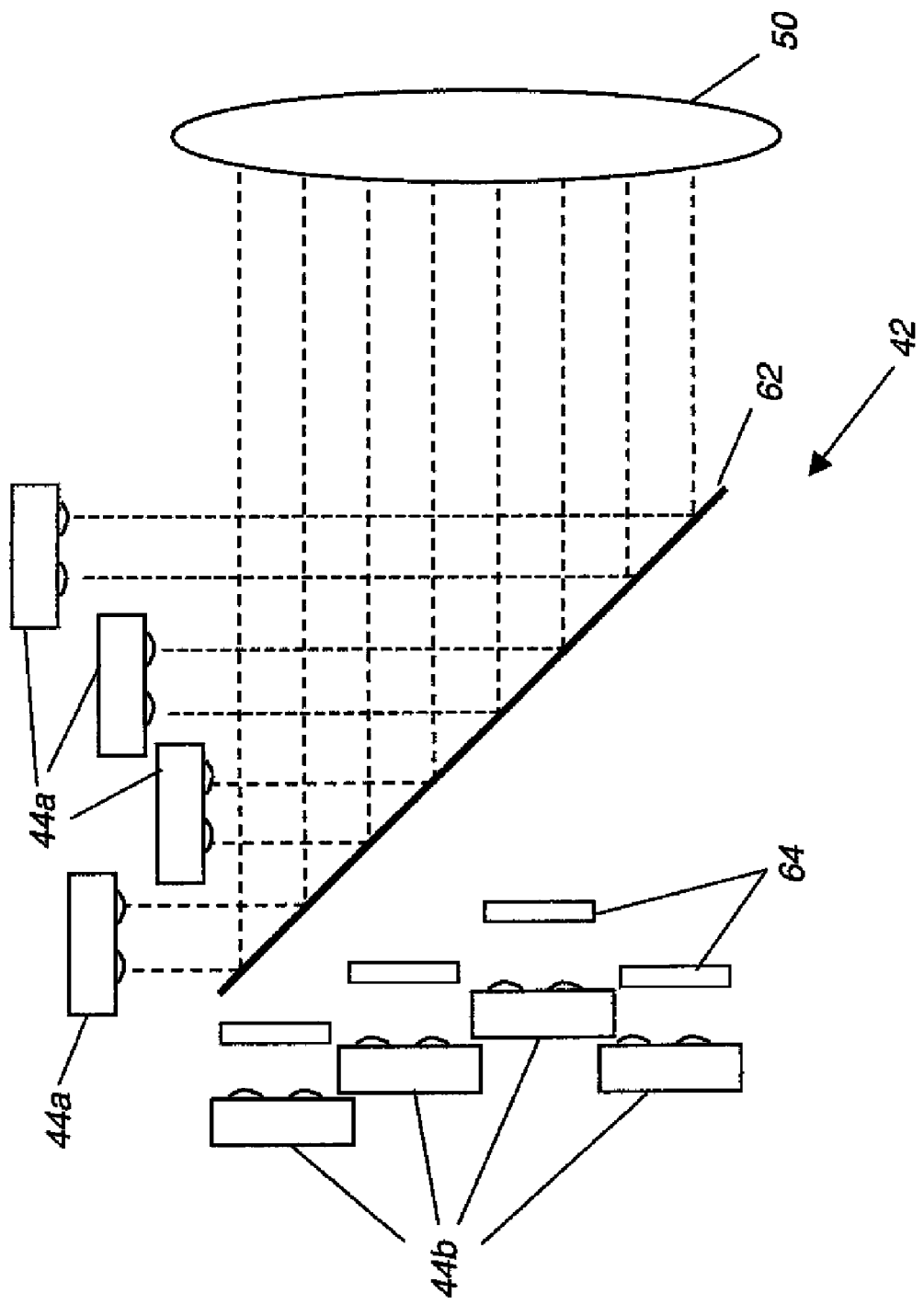
FIG. 7A is a schematic side-view diagram showing the use of a polarization beamsplitter for directing illumination of one polarization state from multiple solid-state light arrays in one embodiment.
Figure 7B:
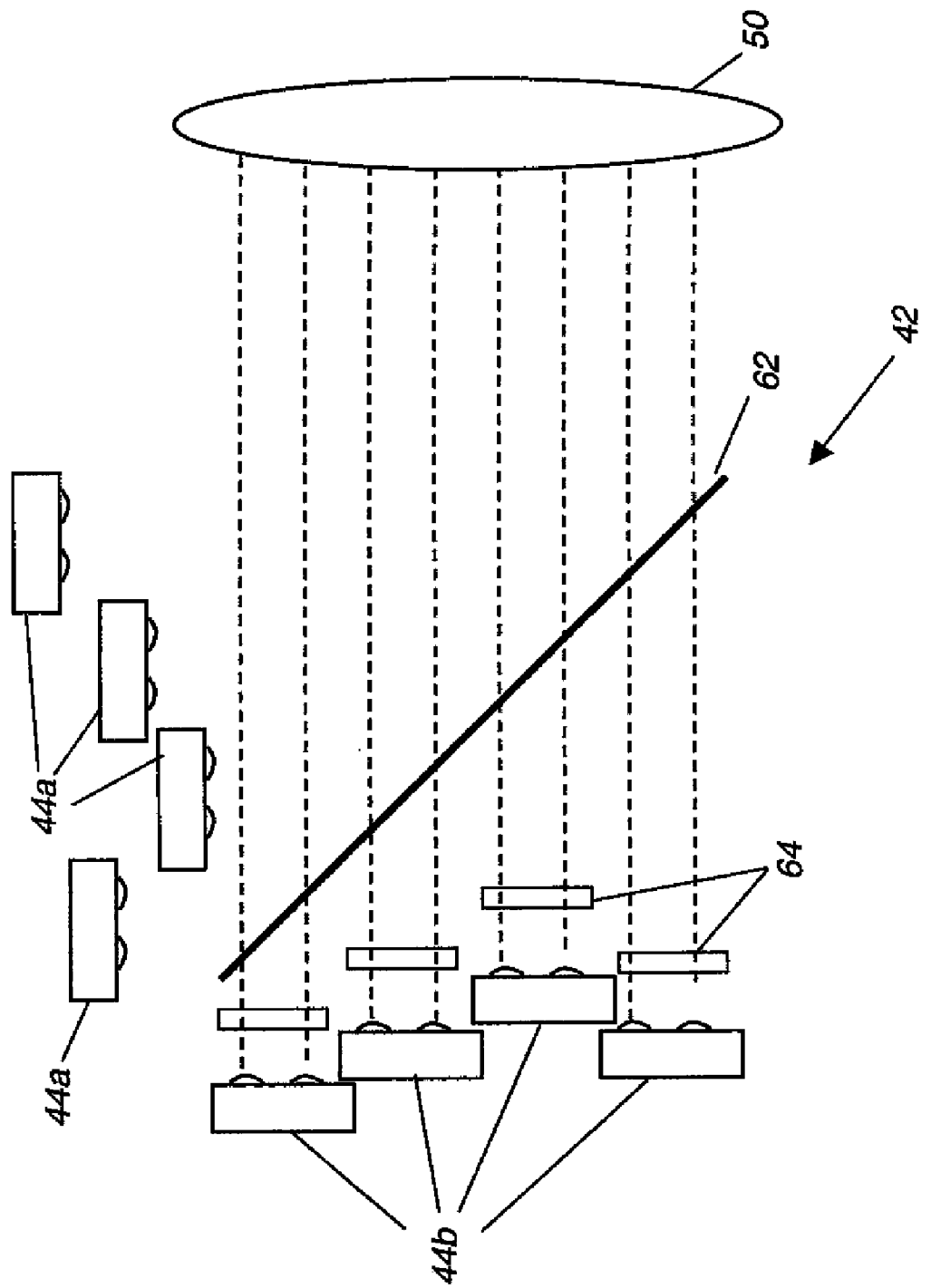
FIG. 7B is a schematic side-view diagram showing the use of a polarization beamsplitter for directing illumination of orthogonal polarization states from multiple solid-state light arrays in one embodiment.
Figure 8:
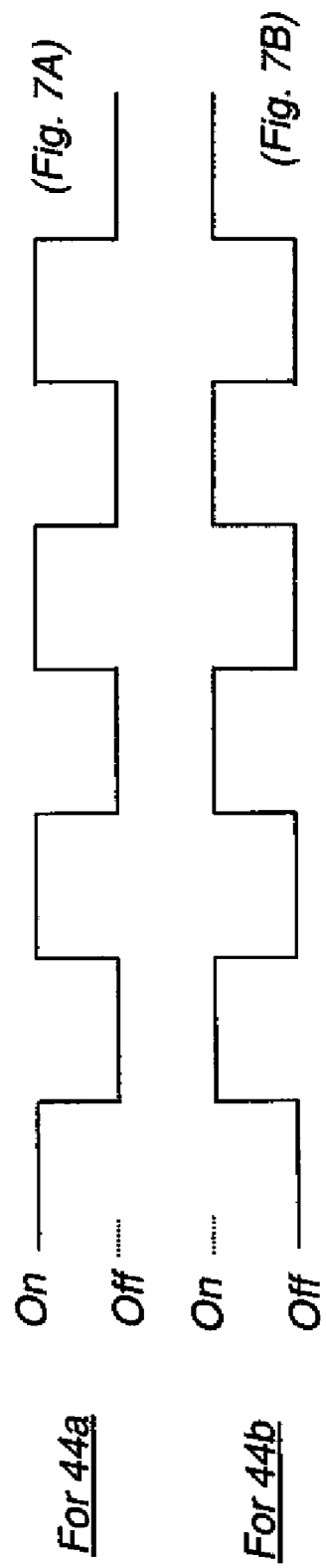
FIG. 8 is a timing diagram that shows the alternating timing of polarization states used for stereo image presentation.

The arrangements shown in FIGS. 5 and 6 can be modified somewhat to allow the use of polarized light having different polarization states, as shown in FIGS. 7A and 7B and in the timing chart of FIG. 8. The timing diagram of FIG. 8 shows, within any one of light modulation assemblies 40r, 40g, and 40b, how light that is directed to the same spatial light modulator 60 (FIG. 4) can be rapidly alternated between two orthogonal polarization states to provide left- and right-eye images accordingly. Here, there are two banks of polarized lasers. For this example, solid state laser arrays 44a and 44b are used. Polarized laser arrays 44a and 44b provide light of orthogonal polarization states, such as using half wave plates 64 for one of these banks of arrays, as shown in FIGS. 7A and 7B. In one half of the alternating illumination cycle, arrays 44a are energized, as shown in FIG. 7A. This light reflects from a polarization beamsplitter 62. In the other half of the alternating illumination cycle, arrays 44b are energized, as shown in FIG. 7B. This light is transmitted through polarization beamsplitter 62. For non-stereoscopic applications, the light from both polarized lasers 44a and 44b may be used together to provide a brighter image, or used at half power to balance the lifetime each laser source.

This arrangement advantageously puts light of either polarization onto the same illumination axis. The etendue using this approach remains the same as shown in the configuration shown earlier for a single channel in FIG. 5. Therefore in non-stereoscopic applications, where both polarization states are imaged, the brightness of the source effectively doubles. However, in the case where stereo display is desired, only a single source is utilized at one particular moment in time, so that the effective brightness remains the same as in FIG. 5. While this arrangement is preferred for its simplicity and provides alternating orthogonal polarization states to the spatial light modulator 60, it requires that the lasers operate consistently over the frequency range needed, in order to have each orthogonal combined laser array turn on and off. For digital cinema applications, this is currently at either 120 hz or 144 hz depending on the setup. Many lasers, however, may exhibit thermal stabilization difficulties, thereby causing unstable power fluctuations in this frequency domain. Therefore, in some cases it is required to indirectly (that is, not through source modulation) alternate the orthogonal state of the light either reaching the modulator or to alter this state subsequently after the modulators.

Figure 9B:
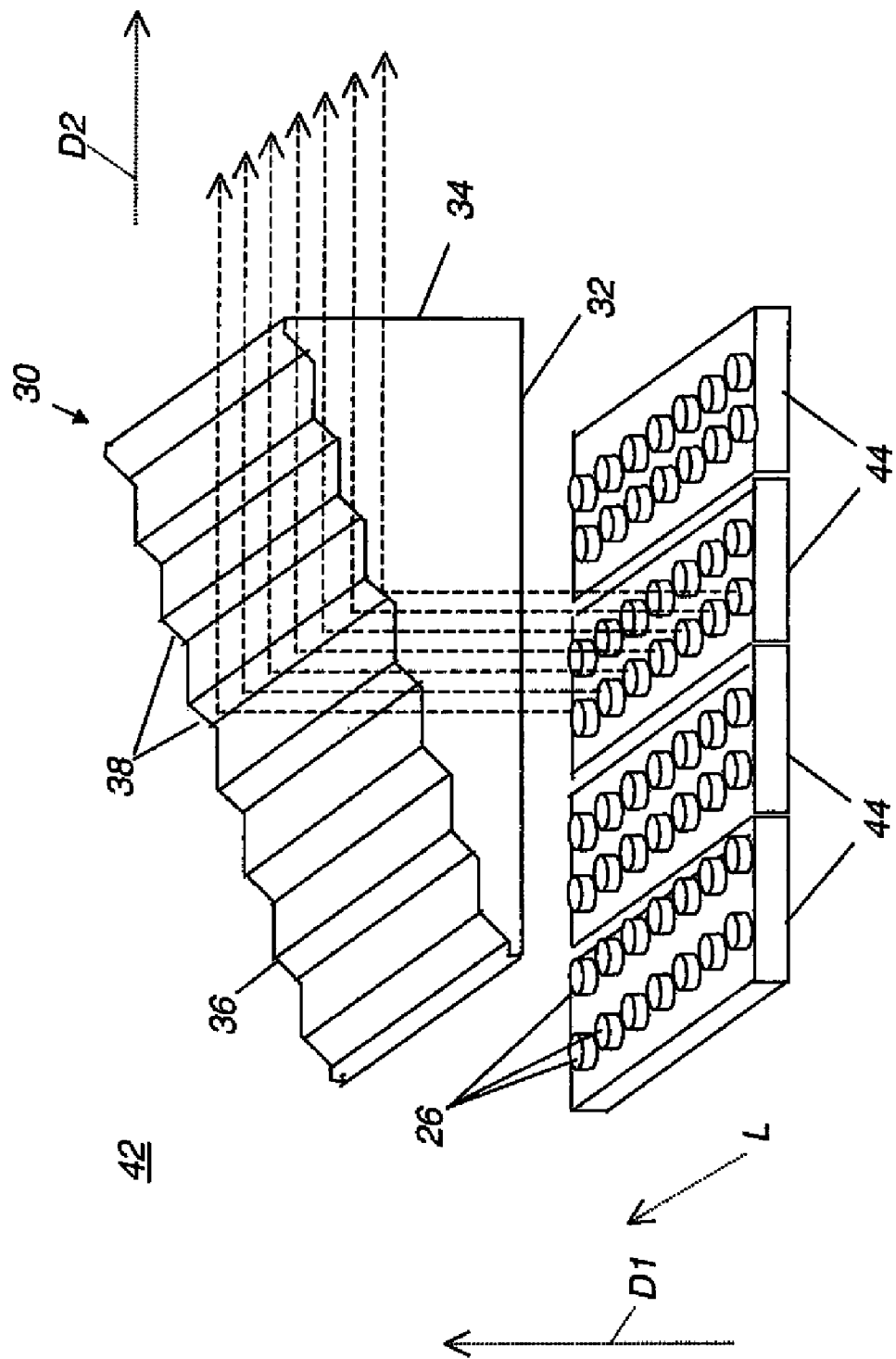
FIG. 9B is a perspective view of the light-redirecting prism of FIG. 9A.

FIGS. 9A and 9B show side and orthogonal views, respectively, of an embodiment of illumination combiner 42 that combines laser light from four solid-state light arrays 44, concentrated within a smaller area. A light-redirecting prism 30 has an incident face 32 that accepts light emitted from array 44 in an emission direction D1. Light is redirected to an output direction D2 that is substantially orthogonal to emission direction D1. Light redirecting prism 30 has a redirection surface 36 that has light-redirecting facets 38. Light-redirecting facets 38 are at an oblique angle relative to emission direction D1 and provide Total Internal Reflection (TIR) to light emitted from lasers 26. When staggered as shown in FIGS. 9A and 9B, these features help to narrow the light path for this illumination, providing a narrower light beam. As FIG. 9B shows, light arrays 44 have multiple lasers 26 that extend in a length direction L. Light-redirecting facets 38 and other facets on redirection surface 36 also extend in direction L.

Figure 10:
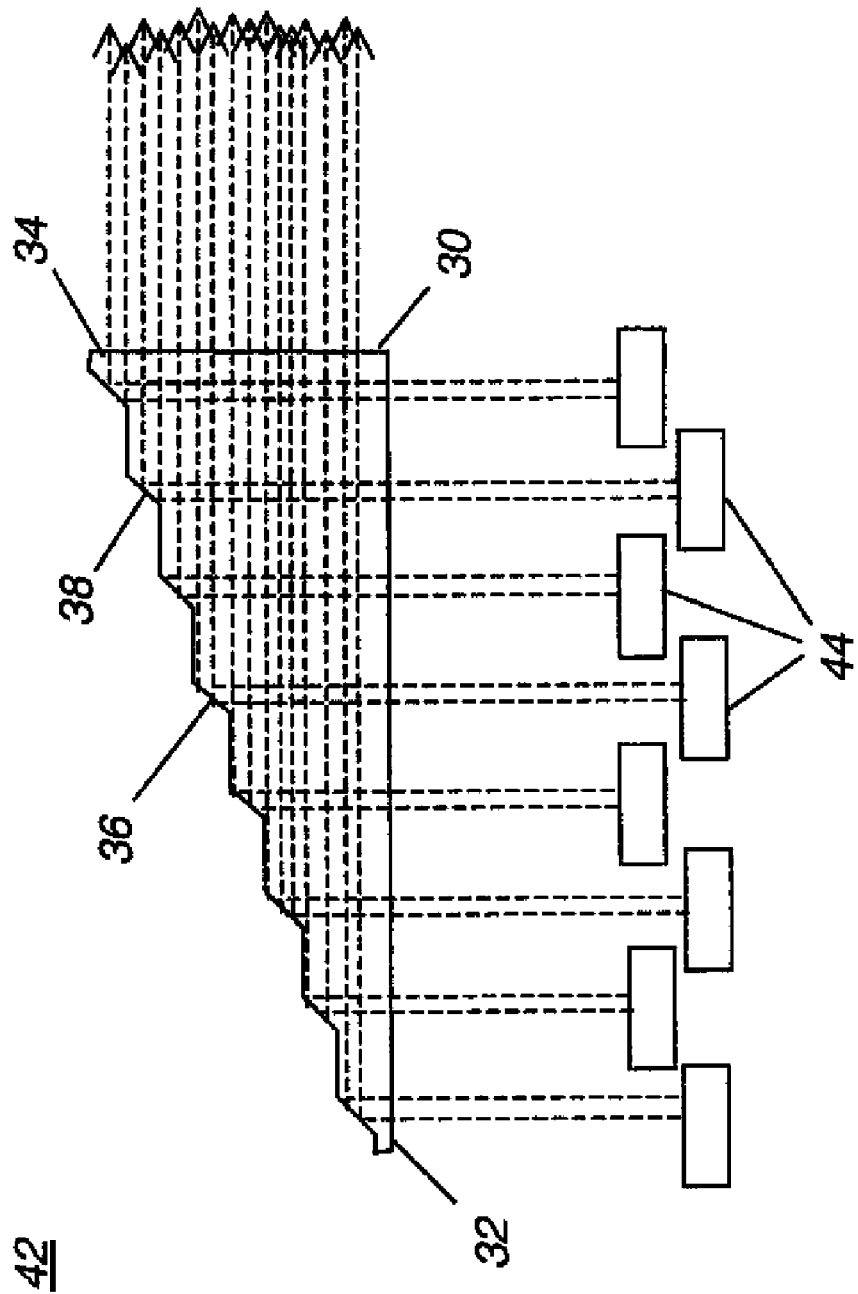
FIG. 10 is a schematic side view of a light-redirecting prism in an alternate embodiment.

A number of variations are possible. For example, the cross-sectional side view of FIG. 10 shows an alternate embodiment in which light redirecting facets 38 of light redirecting prism 30 are scaled to redirect light from multiple rows of lasers 26 at a time. Incident face 32 may not be normal with respect to emission direction D1, allowing some offset to the arrangement of light arrays 44 and requiring that the index of refraction n of light redirecting prism 30 be taken into account.

Figure 11:
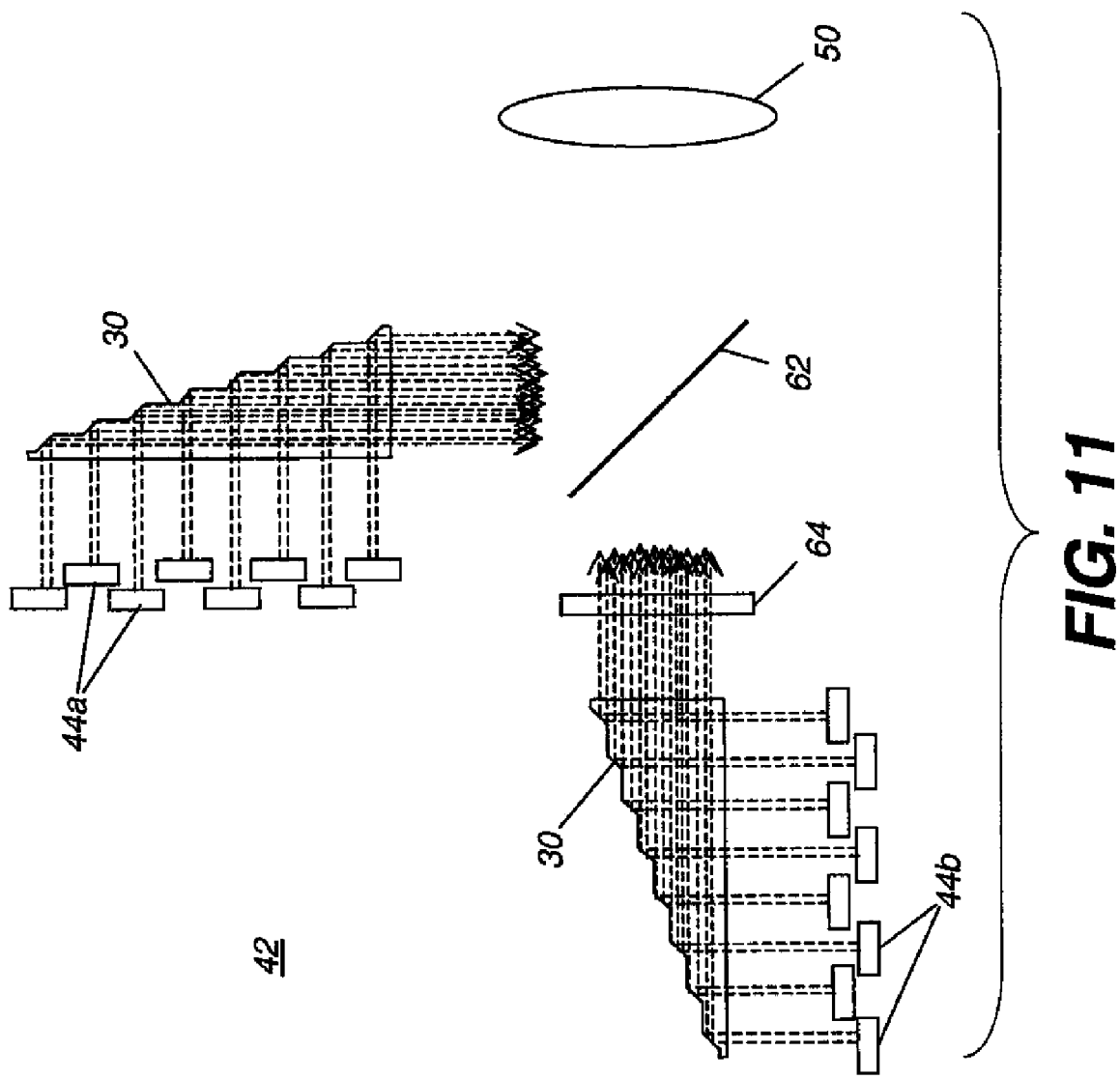
FIG. 11 is a schematic side view showing the use of two light-redirecting prisms, each providing light from solid-state light arrays, each having different polarization.

The schematic block diagram of FIG. 11 shows how multiple light redirecting prisms 30 can be utilized to provide increased brightness in an embodiment that uses alternating polarization states. As was described earlier with reference to FIGS. 7A and 7B, alternating illumination from light arrays 44a and 44b, through polarization beamsplitter 62, directs light of orthogonal polarization states to spatial light modulator 60 for providing a stereoscopic image.

Figure 12:
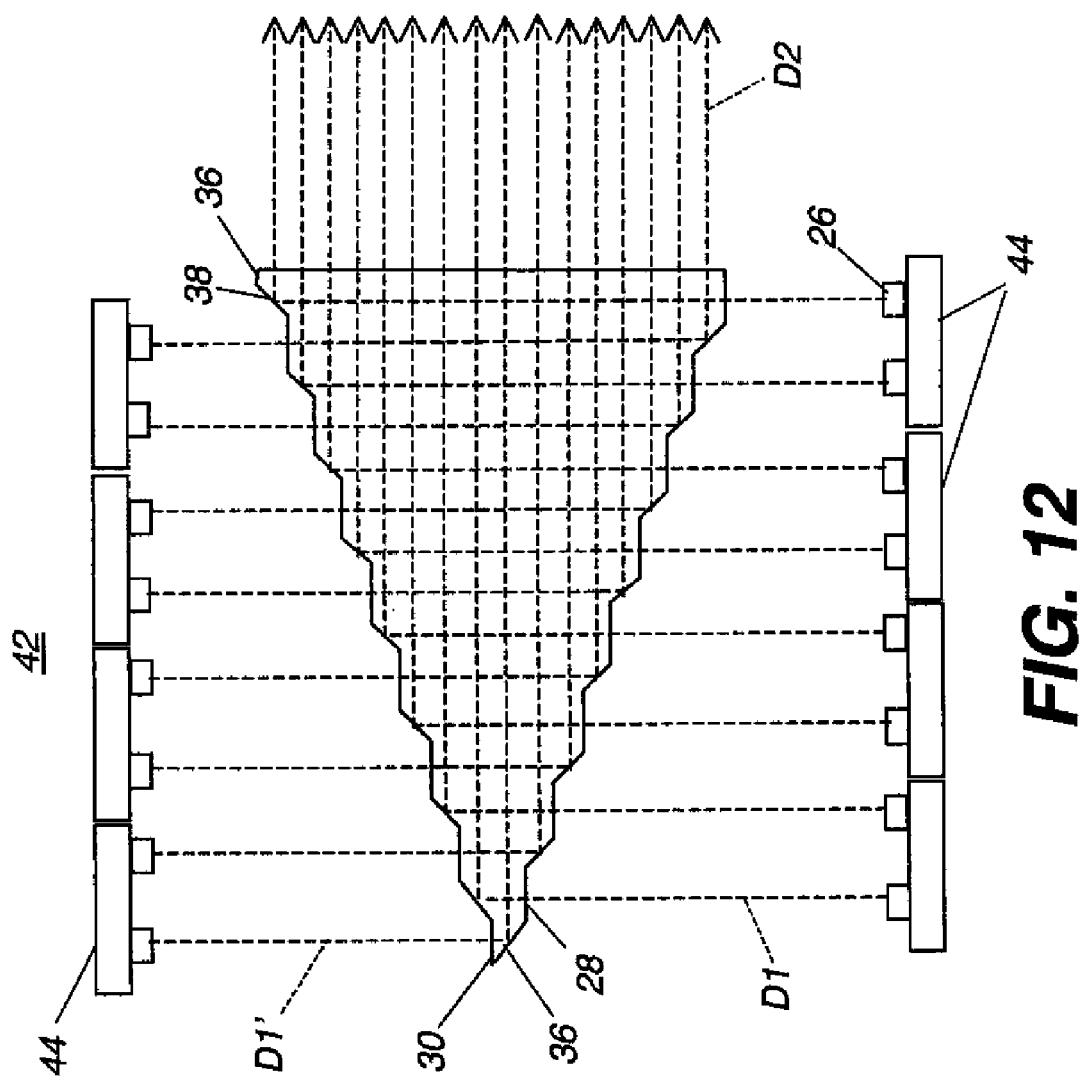
FIG. 12 is a schematic side view showing the use of an embodiment of a light-redirecting prism that accepts light from both sides.
Figure 13:
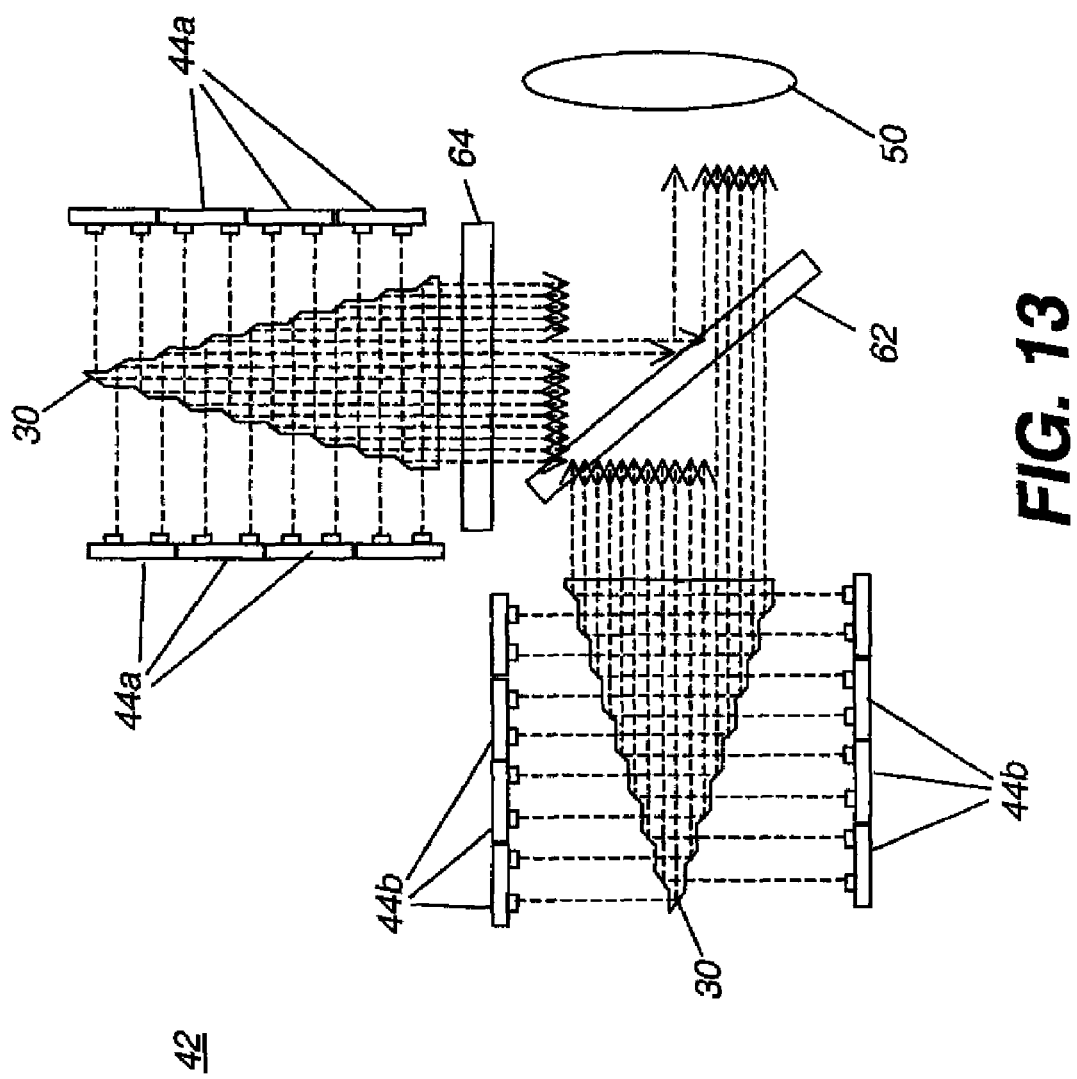
FIG. 13 is a schematic side view of an illumination apparatus using a light-redirecting prism of FIG. 12 for light of each polarization.

The cross-sectional side view of FIG. 12 shows another embodiment of light redirecting prism 30 in illumination combiner 42 that provides an even more compact arrangement of illumination than the embodiment shown in FIGS. 9A-10 for using solid-state arrays. In this embodiment, light redirecting prism 30 has two redirection surfaces 36, accepting light from arrays 44 that are facing each other, with opposing emission directions D1 and D1'. Each redirection surface 36 has two types of facets: a light-redirecting facet 38 and an incidence facet 28 that is normal to the incident light from the corresponding array 44. This allows for easier alignment of the various laser modules 44 to the light redirecting prism 30 by retro-reflection of a small residual light from an anti-reflection coated face back into each of the lasers 26. This retro-reflection can be useful as a means of creating a subtle external cavity that may induce mode instability in laser. While such mode hopping may be considered noise under typical applications, this noise can add value in projection by further reducing the laser coherence (and inter-laser coherence) thereby reducing visual speckle at the image plane. Additionally, with this dual sided approach, laser modules are interleaved with light from differing modules neighboring each other, providing a source of further spatial mixing when the light is optically integrated further in the optical system. This again helps to reduce possible speckle and increase system uniformity. FIG. 13 shows how a pair of prisms 30 can be used to direct light of orthogonal polarization states toward lens 50 from beamsplitter 62.

While it can be seen that this orientation of the prism 30 to laser 44 is preferred, normal incidence light with respect to the input or output faces is not required for combining the illumination sources. It is required, however, that the redirected light beams exiting the prism 30 at the output face or surface(s) 34 be substantially parallel to each other. Achieving this requires careful consideration of a number of factors. These factors include the combination of the angle of incidence of the lasers 44 on each side (as they may be different) to input facets on each side and the refraction in the prism based on the index of refraction of the material. In addition, the reflection off of the redirecting facets from each side (again, these may be different on each side) must be considered and its combination with the refraction of the prism must cooperate so that output light beams from the exit face(s) are in parallel.

Figure 14:
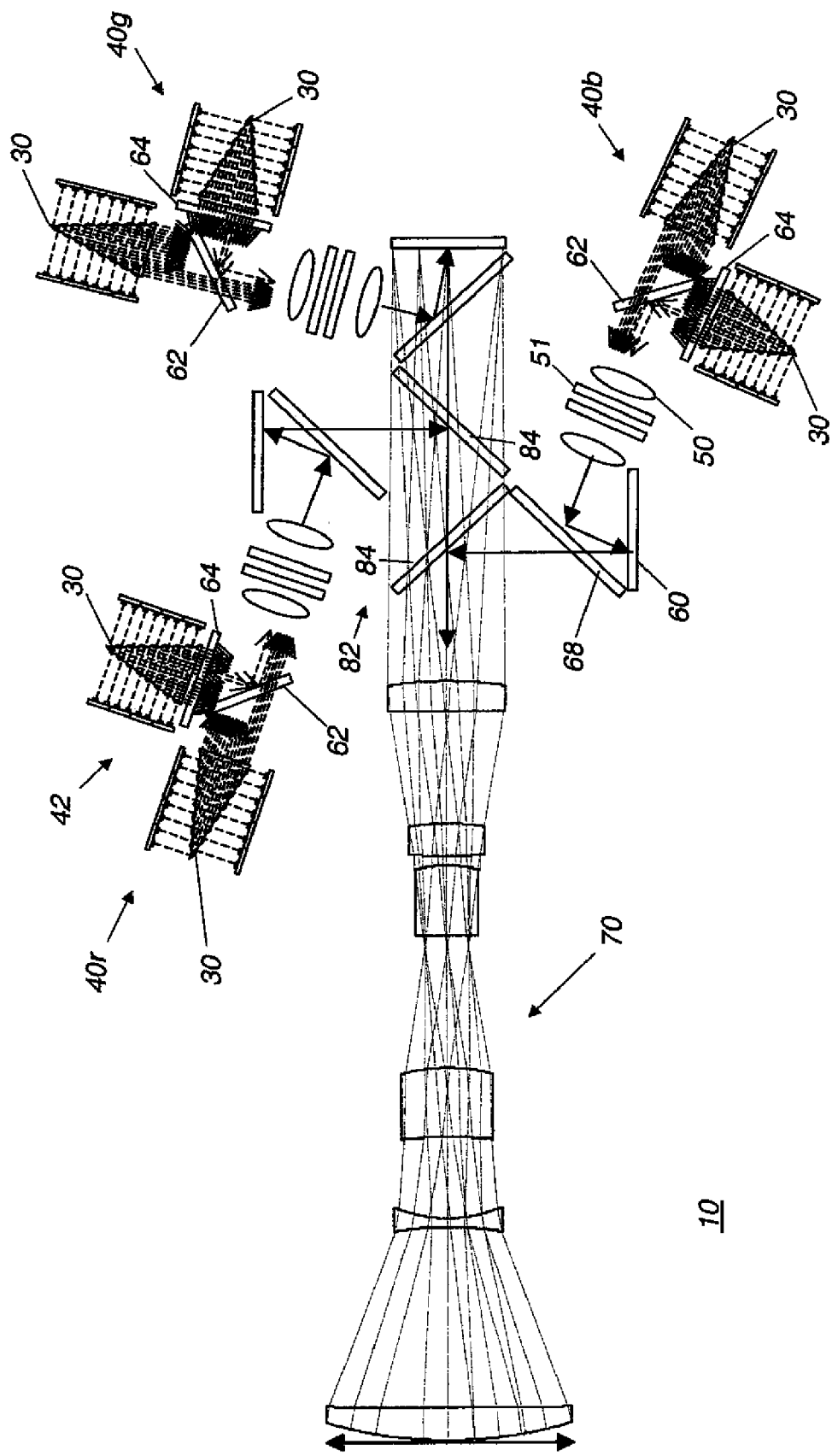
FIG. 14 is a schematic diagram of an alternate projection apparatus using polarized illumination with the light-redirecting prisms of FIG. 12, without light guides.

The schematic block diagram of FIG. 14 shows an embodiment of projector apparatus 10 that uses light-redirecting prisms 30 in each color channel. Each light modulation assembly 40r, 40g, and 40b has a pair of light redirecting prisms 30 with a similar arrangement of polarization-directing components as that described for FIG. 13. In each light modulation assembly, polarized light from one or the other light redirecting prism 30 is directed through polarization maintaining light guide 52 (not shown in FIG. 14) to lens 50 and integrator 51 through polarization beamsplitter 62. Spatial light modulator 60 is a digital micromirror or other MEMS device that modulates light maintaining two orthogonal orientations of output light related to the orthogonal orientations of the input light. In the embodiment shown, designed to use the angular modulation of a micromirror device, thin film coated surface 68 is treated to reflect or transmit incident light according to its incident angle, so that modulated light is directed to a dichroic combiner 82. Dichroic combiner 82 has an arrangement of dichroic surfaces 84 that selectively reflect or transmit light according to wavelength, combining the modulated light from each light modulation assembly 40r, 40g, and 40b onto a single optical path through projection optics 70. While light guides can be utilized between the lasers and the modulator, this embodiment can be an advantage because such light guides can degrade polarization of the transmitted light. For such an embodiment, lenslet arrays would offer advantages for uniformizing the illumination, since polarization states are maintained. However, this type of embodiment does not enjoy the advantages provided by a light guide (not shown), such as improved heat separation between the lasers illumination section and the modulator projection optics section. In either embodiment, the laser light may be used in the near field condition or in the far field condition, where premixing of the light is provided to reduce possible speckle and to further improve the uniformity of the light provided to the integrator 51. Laser speckle is further reduced by the use of an arrangement of independent lasers combined to form a single illumination source, as well as the use of uniformizing optics like lenslet arrays.

The present invention allows a number of variations from the exemplary embodiments described herein. For example, a variety of polarized laser light sources could be used as alternatives to VECSEL and other laser arrays. Light redirecting prism 30 can be made from many highly transmissive materials. For low power applications, plastics may be chosen. For higher power application, glass may be more appropriate.

One of the significant advantages of lasers is their small etendue, enabling higher efficiency, simpler optical systems. Unfortunately, as just discussed, small etendue also means relatively high energy densities on components when used in digital cinema-based systems. In systems where the lasers cannot be directly modulated to create alternating orthogonal polarizations, it is necessary to rotate the polarization state or block one of the orthogonal polarization states by alternative means. One method of doing this is to utilize electronic polarization rotators or shutters, such as liquid crystal retarders or liquid crystal shutters.

Figure 16:
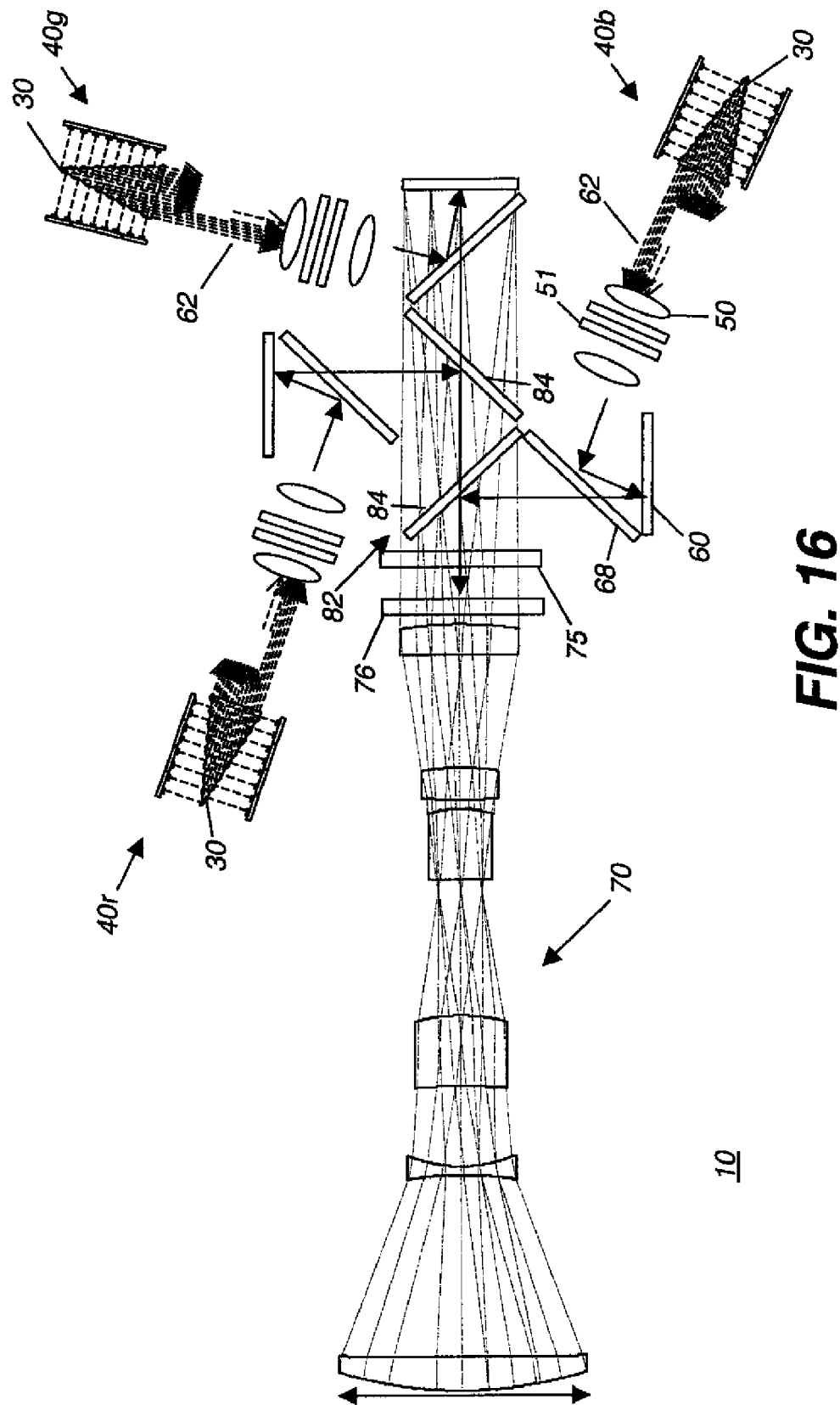
FIG. 16 is a schematic diagram of a stereo projection apparatus using the configuration of FIG. 14, in conjunction with a broadband electronic polarization rotation device.

FIG. 16 shows a stereoscopic embodiment where a broadband electronic polarization rotator 75 is used to successively switch between two output polarization states for left- and right-eye images. Polarization rotator 75 is located following combination of modulated beams in the optical path, after beam combiner 82 combines the modulated beams. Polarization rotator 75 is considered broadband in that it must be able to rotate the polarization states equally over the visible spectrum created by the combined light sources. This location is an advantage because the projected beam size is relatively large. Therefore, the energy density on the retarding element is near its lowest for a combined beam. Optional ¼ waveplate 76 may be placed either directly before or after polarization rotator 75, depending upon preference for polarization properties. In this case it is desirable to have all of the laser light from all of the sources the same orientation. Half wave retardation plate retarder or color selective retarder may be used along the light path to correctly orient the polarization states. Additionally, a polarizer may be used to block or reflect any spurious polarization state prior to the electronic polarization rotator 75.

Liquid crystal variable retarders, as an example of electronic polarization rotators 75, are easier to fabricate with relatively uniform retardance verses wavelength when the input polarization state is circular. For this device type, then, it may be preferable to locate ¼ waveplate 76 directly after the beam combiner 82 and before the electronic polarization rotator 75. Alternately ¼ waveplates may be placed in each of the primary color paths, however this requires multiple elements. Stereo imaging is thus created by timing the corresponding image content intended for each eye in synchronization with liquid crystal rotator 75. Additionally, a polarization maintaining display surface is used and viewer polarization glasses are provided, so that each eye receives light of only the intended orthogonal polarization states.

Figure 15:
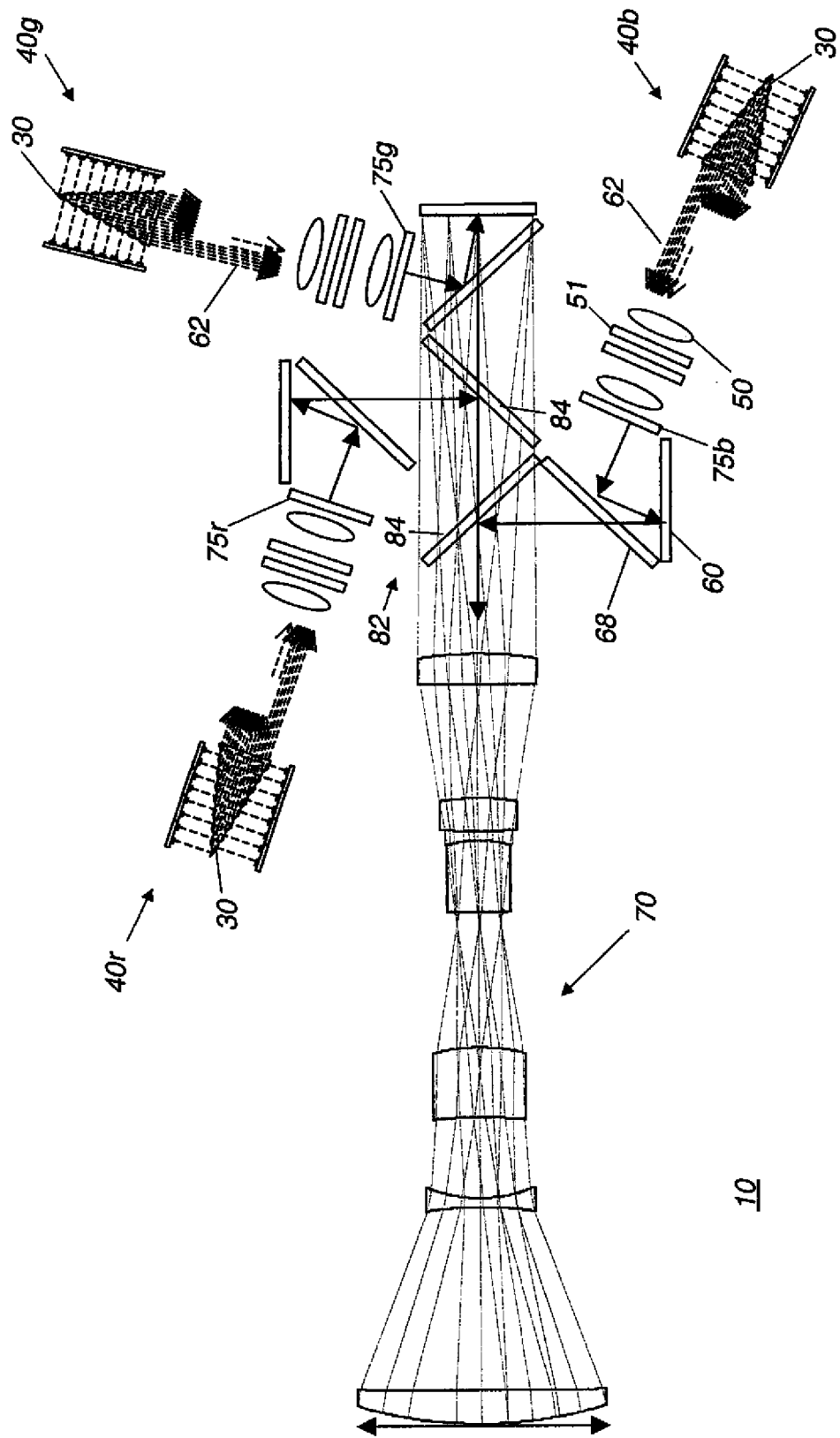
FIG. 15 is a schematic diagram of a stereo projection apparatus using the configuration of FIG. 14, in conjunction with individual color band electronic polarization rotation devices.

While the embodiment of FIG. 16 minimizes the energy density for a combined image, this energy density may still not be low enough to prevent damage to the polarization rotator. In many cases it is also simpler to create an electronic polarization rotator for a narrow band of light. An alternate embodiment, shown in FIG. 15, has a narrow band polarization rotation component 75r, 75g, 75b in each leg of the illumination sections 40r, 40g, 40b. In this case, the electronically controlled polarization rotator only needs to perform a substantially half wave rotation for the narrow spectrum of a single color band, on the order of 1 nm. In the case where the electronic polarization rotator is of a liquid crystal based electronic retarder, this greatly simplifies the structure and works well in linearly polarized light. Thus the cost and complexity of each of these rotators is reduced. Placing the polarization retarder after the integrator 51 eliminates potential higher energy density "hot spots" that might occur from more direct laser illumination. This balanced light/heat load improves the stability and performance of the device. Additionally, as only a single band is used and is maintained on the device without modulation, a more consistent and lower energy density can be delivered, compared with the embodiment described earlier and shown in FIG. 16. As before, an optional ¼ waveplate retarder may be used either on each of the color bands, or as in FIG. 16, after the color combiner in the system. Similarly a polarizer may be used prior to the electronic polarization rotator in order to provide the optimum polarization states.

Multiple laser combiners may be utilized such as in FIG. 14, where each combiner has a different orthogonal polarization state and adjacent wavelength spectrum associated with it. For example the illumination unit 40b may be comprised of a combiner with linear p polarization and a second combiner with s polarization states. The primary spectrum of the first combiner may be shifted from the second combiner by 15-25 nm. A polarizing beamsplitter 62 may be used to combine the sets of lasers together. Subsequently, a color selective polarization retarder may be used in the path after the beamsplitter 62 to rotate only one of the two combiner spectral wavelengths by 90 degrees so as to align its polarization state with that of adjacent spectrum form the alternate combiner. In this way, no etendue is gained in the system and electronic polarization rotator 75 from FIG. 15 may be utilized to rotate the single polarization state orthogonally to create light for imaging to each respective eye.

Figure 18:
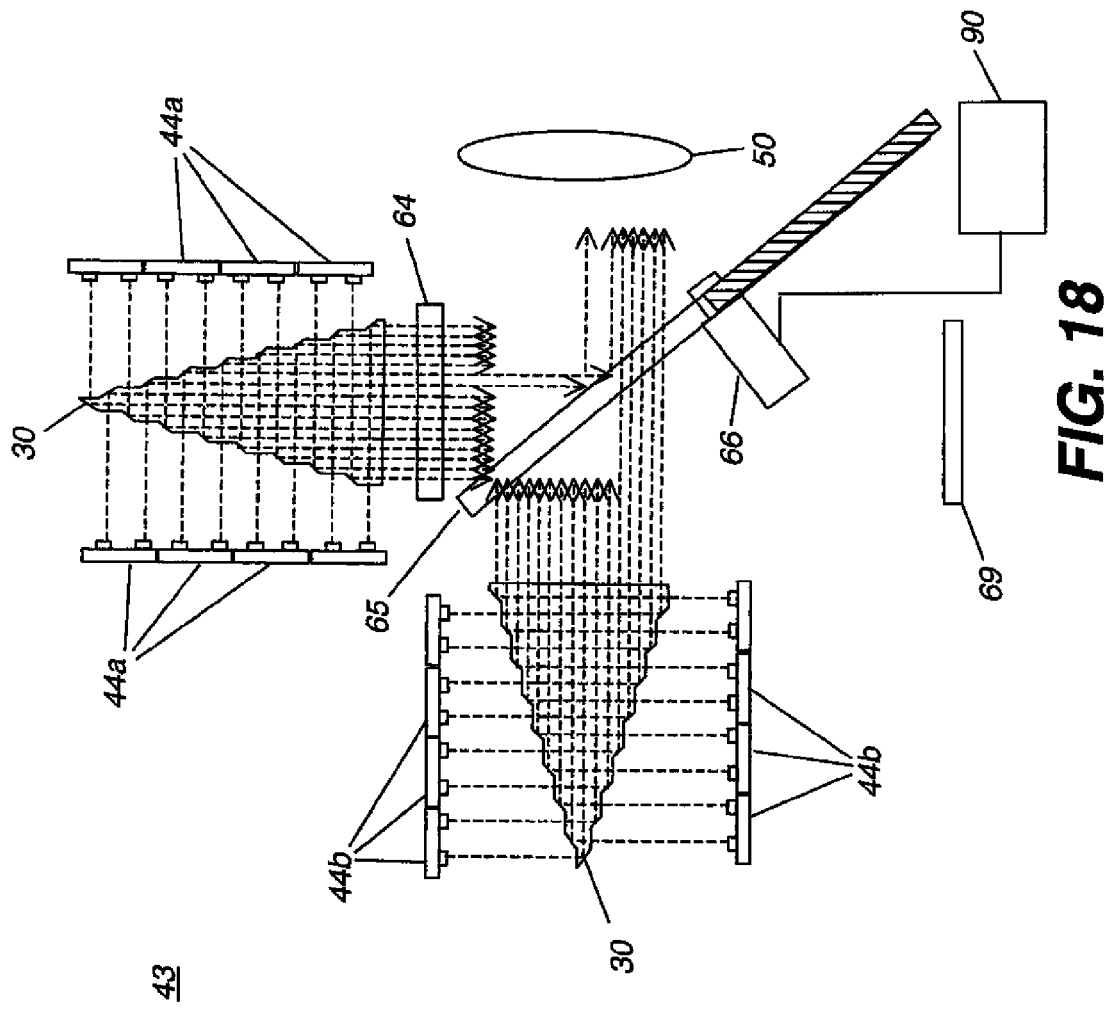
FIG. 18 is a schematic diagram of a shutter system alternately selecting light of each orthogonal polarization.

Another method for creating alternating orthogonal polarizations in order to generate a stereoscopic viewing experience is to mechanically shutter between the two orthogonal states combined laser assemblies as shown in FIG. 18. In an illumination combiner 43, lasers 44*b* are combined to generate a linear polarization state, while lasers 44*a* in conjunction with ½ waveplate 64 form light of a linear polarization state that is orthogonal to those of 44*b*. A rotating shutter 65 is placed in the path of the optical axis merged between the orthogonal polarization states. The position of rotating shutter 65 is controlled by a control logic processor 90 that controls a motor 66. Rotating shutter 65, shown in plan and side views respectively in FIGS. 19A and 19B, preferably has a glass disk with a least two segments. A first segment 65*a* is designed to substantially transmit all of the light that is incident upon it. The alternate segment 65*b* is designed to substantially reflect all of the light that is incident upon it. When transmission segment 65*a* lies along the optical axis, lasers 44*b* transmit through to the system, while lasers 44*a* are absorbed by a beam dump 69 (as shown in FIG. 18). Alternately, when reflective segment 65*b* is along the optical axis, light from lasers 44*a* are reflected through to the system, and light from 44*b* is directed to beam dump 69. In this manner, light of alternating orthogonal polarizations is delivered to the spatial light modulators to create the stereoscopic images by rotating the shutter 65, actuated by a motor 66, in synchronization with the stereoscopic images on the spatial light modulator. It should be noted that there is a transition region 73 between polarization states, as noted in FIG. 19A. Here, illumination light 67 can be between the two regions 65*a* and 65*b*. In this case, polarization of both states is inadvertently delivered to the spatial light modulator. This condition causes crosstalk between the images of the two eyes, also known as ghosting. Some amount of crosstalk may be acceptable. If the crosstalk is excessive, the spatial light modulator may be turned to the off state during this transition period, eliminating the crosstalk at the cost of some lost light. Therefore, it is desirable to minimize this transition region. This can be achieved by either minimizing the spot size of the illumination light or by enlarging the shutter wheel, placing the illumination light as far toward the outer diameter as practical.

While the embodiment of FIG. 18 functions to alternate the polarization states of light directed to the spatial light modulator, over 50% of the light is lost to beam dump 69. This essentially reduces system efficiency to that of conventional approaches. Another embodiment, shown in FIG. 20, extends the use of shutter 65 to recover the light that was previously delivered to beam dump 69. In an illumination combiner 45, the light formerly in this path has its polarization state converted by a ½ waveplate 64. The two illumination sources may also be made orthogonal polarization states by simply rotating each of the sources such that the outputs are orthogonal. In either case, this converts the light to the same polarization state that is directly delivered to the spatial light modulator by shutter 65. This converted light is then directed by mirrors 71 to a path that is adjacent to the light from shutter 65. The combined light of both laser arrays, now of the same polarization state, is delivered to integrator 51 and to the spatial light modulator. Again, by rotating shutter wheel 65 using motor 66, light is alternately delivered in orthogonal polarization states.

For the embodiment of FIG. 20, it can be observed that the etendue of the light source has doubled compared with its state as delivered in FIG. 18. This etendue may be provided to the uniformizing optics with double the area, with the original and converted beams side by side and in the same angular space. Alternately, the light may be provided with some amount of overlap from each laser source. Angular overlapping may be more desirable because it would be easier to achieve a uniform illumination for all pixels by mixing in this space, as the projection lens is typically telecentric. While the optics following the illumination path needs to handle this large etendue in order to be efficient, this is not a very difficult problem due to the nature of the low starting etendue of laser sources.

Figure 21:
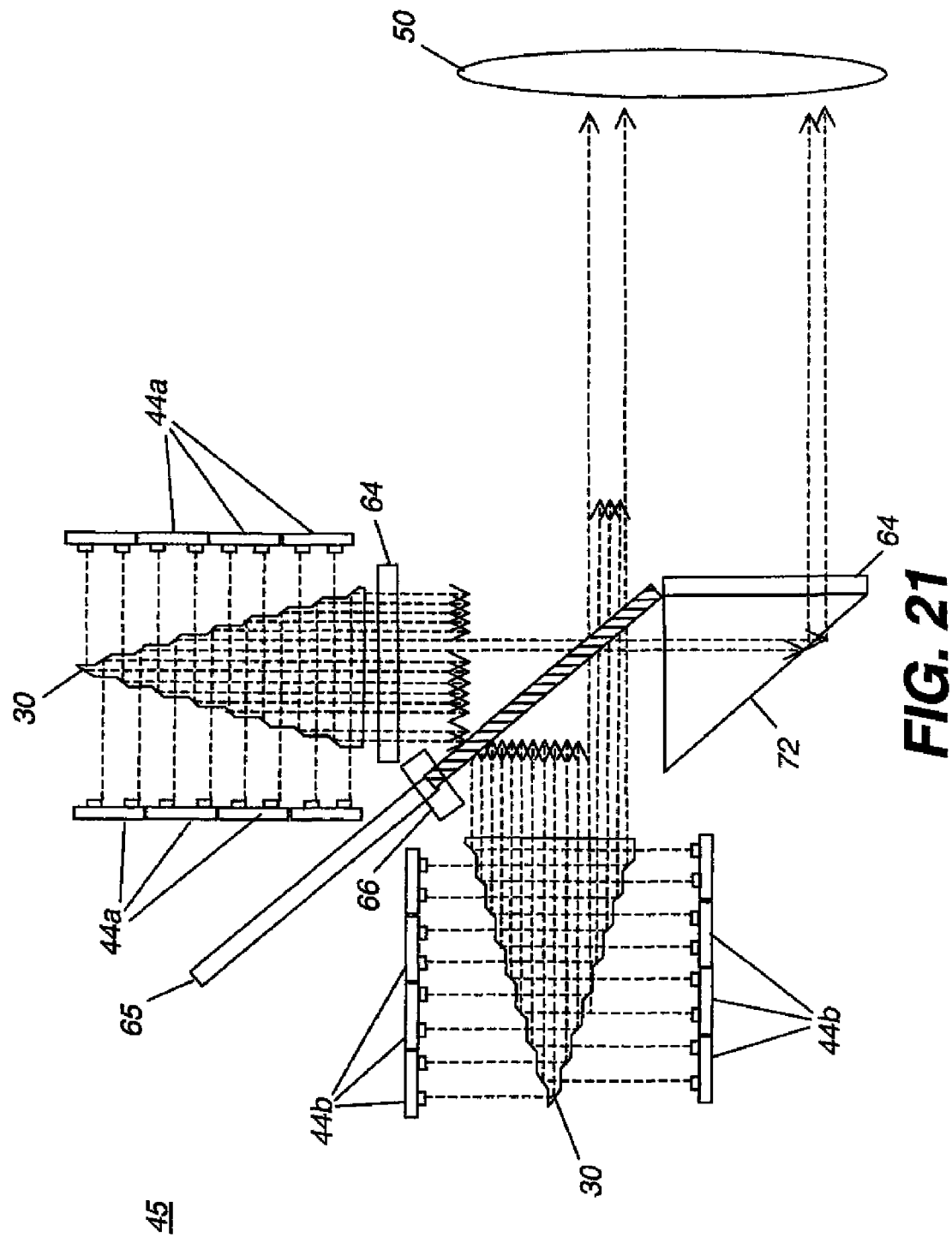
FIG. 21 is an alternate embodiment of the recycling illumination system shown in FIG. 20.
Figure 22:
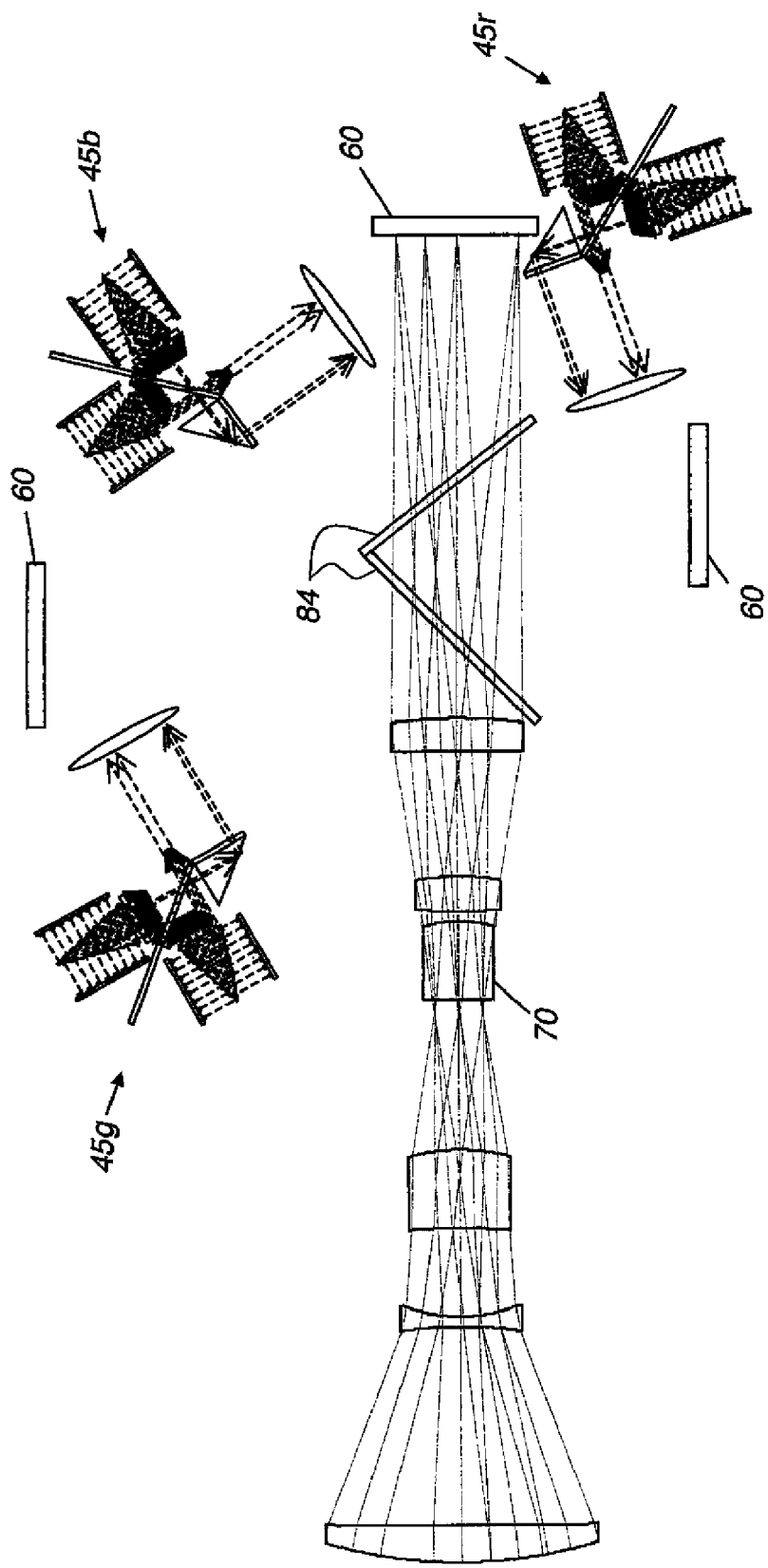
FIG. 22 is a schematic diagram of a stereo projection apparatus using alternating orthogonal polarization states provided by the illumination system described in FIG. 21.

FIG. 21 shows an alternate embodiment that uses this recovered polarized light but requires fewer components. Mirrors 71 in the embodiment shown in FIG. 20 are replaced by a prism 72 or mirror (not shown). Prism 72 is placed in close proximity to shutter disk 65 to simplify the optical folding and minimize the spacing between the two light paths. FIG. 22 shows a projection system incorporating the alternating orthogonal polarization illumination systems 45*r*,45*g*, 45*b* shown in FIG. 21, directly illuminating spatial light modulators 60 in each color channel and recombined with dichroic plates 84 to be projected by lens assembly 70.

This same approach works appropriately for non-stereoscopic projection as well without additional light loss, even during the transition regions. Therefore, unlike conventional solutions, it is not necessary to remove the shutter wheel or polarization switch in order to improve the throughput efficiency for conventional imaging. In this case, motor 66 may be shut down to save on lifetime or power consumption during non-stereoscopic imaging, preferably with the transmissive region of the shutter in the optical path so that unnecessary coating damage and heat buildup can be minimized.

Figure 19B:
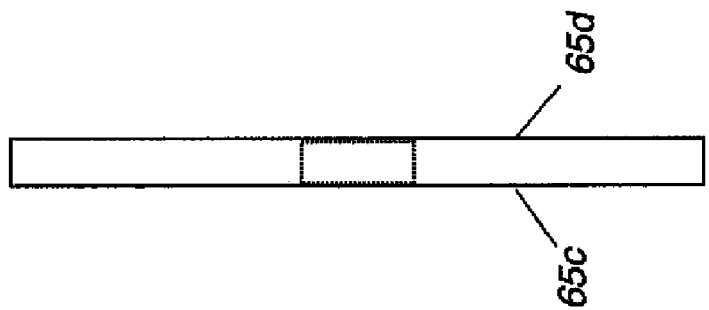
FIGS. 19A and 19B show front and side views, respectively, for a shutter that reflects light from one side and transmits light from the other.
Figure 19A:
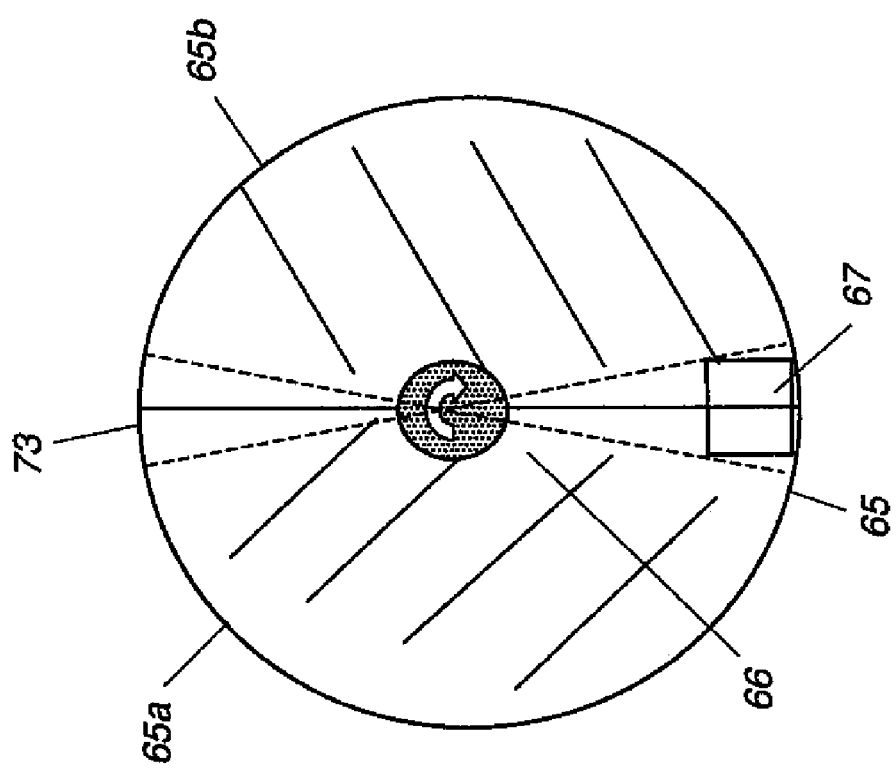

The rotating shutter mechanism of FIGS. 19A and 19B may serve an added speckle reduction function in addition to providing an alternating orthogonal polarization method. Speckle was discussed earlier as a potential issue for laser projection. While the use of multiple lasers tends to reduce the general coherence of the lasers to substantially reduce speckle, there can be residual coherence, especially in the case of small screens where fewer lasers are used. A coherence-breaking coating may be applied to one or both sides of the shutter. Additionally the use of uniformization optics which mixes the light either spatially or angularly, in conjunction with a variable optical path variation from wavefront deviations in the shutter substrate, substantially reduces any remaining coherence and, therefore, speckle.

FIG. 19B shows shutter 65 with one side 65*c* fabricated with a ground surface, while the opposite side 65*d* contains the polished surface with anti-reflection coating in one segment and a mirror coating in the alternate segment. The surface roughness should be high enough to eliminate visual speckle, but low enough to not substantially increase the angular extent of the source. This relatively rough surface in conjunction with the rotating wheel (spatial motion) can also reduce or eliminate any residual speckle from the system. Alternately, as described earlier, both sides 65*c* and 65*d* may be polished, however the surfaces may not be optically flat such that multiple waves of optical path difference are induced into the light beams varying at the rotational frequency. This is preferred over a non-polished surface in that it does not substantially increase the angular content of the illumination light and therefore increase the etendue.

Figure 17:
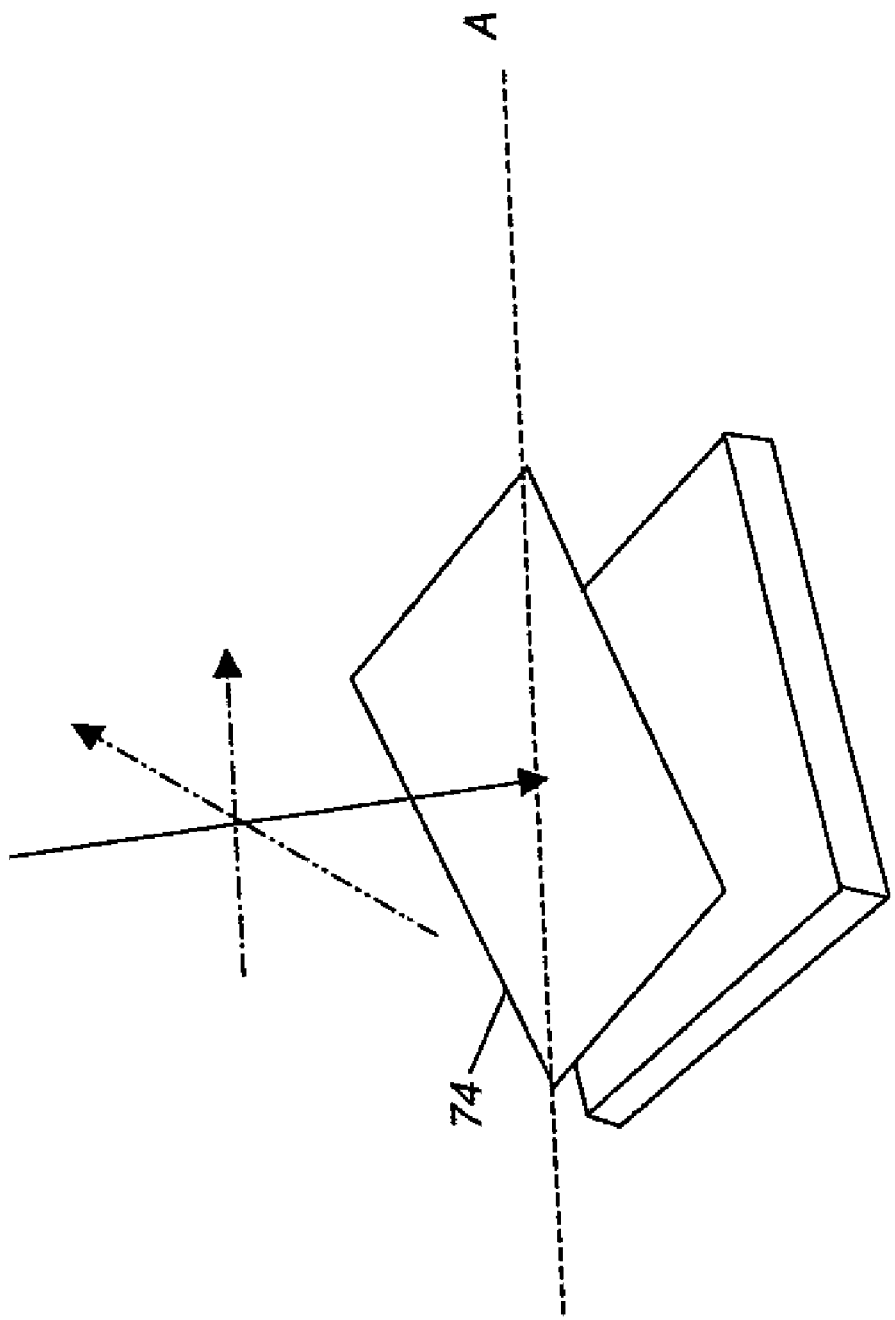
FIG. 17 is a perspective view showing a single pixel modulator and its axis of rotation.

Most Micro-Electromechanical Structures (MEMS) such as DLP devices use a metallic reflector, typically formed from aluminum. Metal mirrors create very small phase shifts upon reflection when handling light from a skew angle. The preferred polarization orientation, where the DLP device maintains the polarization state after reflection, has the polarization axis either in line with or orthogonal to the hinge pivot tilt of the micro-mirror 74, as shown in FIG. 17. Axis A indicates the hinge pivot line for a DLP micromirror. Polarization states oriented along other axes with regard to the plane of the micro-mirror 74 can be used with minimal effect to the residual polarization, however.

A modification to the current DLP package would be required regarding the cover plate hermetic package. The current package is designed to provide an environmental seal as well as a defect-free surface to prevent scattering from impacting image quality. As such, the process of laser welding and thermally fusing windows into mechanical frames induces significant and inconsistent birefringence into each package. Variations in retardance of over 3 nm have been observed across sample devices. This would negatively impact the maintenance of the polarization state out of the device. Therefore new window packaging would be useful in order to properly utilize DLP devices with polarized light. Packages can be improved by utilizing a glass that has a low coefficient stress or thermally induced birefringence, such as SF57. An alternate approach would be to provide stress free mounting of a window to the window frame, for example using RTV to bond the window in place. Further isolation would be desired such that the mechanics of the window frame are rigid with respect to the window, but flexible with respect to the bonding surfaces to the chip frame. Likewise, this approach could be reversed. Further, it would benefit the procedure for bonding the window to the frame and the frame to the chip mounting if performed at the carefully controlled chip operational temperatures, so as to avoid stresses from an operational and packaging temperature difference.

The use of polarized laser light sources offers significant advantages for the projection of stereoscopic imagery. The efficiency gains over the conventional illumination sources discussed earlier allows the projector to more easily deliver images with brightness that is comparable with that of conventional 2D projection.

The invention has been described in detail with particular reference to certain preferred embodiments thereof, but it will be understood that variations and modifications can be effected within the spirit and scope of the invention. For example, where laser arrays are described in the detailed embodiments, other solid-state emissive components could be used as an alternative. Supporting lenses and other optical components may also be added to each optical path. In optical assemblies shown herein, the order of the uniformization or light integration and relaying can be reversed without significant difference in effect.

Thus, what is provided is an apparatus and method using polarized illumination for stereoscopic digital cinema projection having enhanced brightness.

PARTS LIST

10. Projector apparatus
12. Light source
14. Prism assembly
16. Position
18. Optics
20, 20r, 20g, 20b. Spatial light modulator
26. Laser
28. Incidence facet
29. Projection lens
30. Light redirecting prism
32. Incident face
34. Output face
36. Redirection surface
38. Light-redirecting facet
40r, 40g, 40b. Light modulation assembly
42. Illumination combiner
43. Illumination combiner with shutter assembly
44, 44', 44a, 44b. Solid-state light (laser) array
45, 45r, 45g, 45b. Illumination combiner
46. Interspersed mirror
50. Optical lens
51. Integrator
52. Light guide
54. Lens
60. Spatial light modulator
62. Polarization beamsplitter
64. Half wave plate
65. Rotating shutter
65a. Transparent segment (first)
65b. Reflective segment (alternate)
65c. Diffuse side (fabricated)
65d. Polished side (coated)
66. Motor
67. Illumination light
68. Dichroic surface
69. Beam dump
70. Projection optics (lens)
71. Mirror
72. Prism
73. Transition Region
74. Micro-mirror
75, 75r, 75g, 75b. Electronic polarization rotator
76. Quarter wave plate
80. Display surface
82. Dichroic combiner
84. Dichroic surface
90. Control logic processor
A. Axis
D1, D1'. Emission direction
D2. Output direction
A1. light source
A2. Modulator
$\theta 1$. Output angle
$\theta 2$. Acceptance angle
R. Red
G. Green
B. Blue
L. Length direction

The invention claimed is:

1. A stereoscopic digital image projector comprising:
 a) a plurality of light modulation assemblies, each comprising:
  at least one solid-state light source energizable to provide illumination having a first polarization axis;
  a polarization rotator disposed in the path of the polarized illumination from the solid-state light source(s) and actuable to controllably rotate the polarization axis from the solid-state light source(s) to a second polarized axis; and
  a micro-electromechanical spatial light modulator in the path of the polarized illumination and energizable to modulate the polarized illumination to form a first modulated light from illumination of the first polarization state and to form a second modulated light from illumination of the second polarization state;
 b) a synchronizing means to temporally control the polarization rotation to match the appropriate image data on the spatial light modulator; and c) projection optics for directing the first and second modulated light toward a display surface.

2. The projector of claim 1 wherein two adjacent spectral band solid-state light sources of orthogonal radiation are combined using a polarization beamsplitter and the polarization axis from one of the two adjacent spectral bands is subsequently rotated to match the polarization axis of the other by a color selective retardation means.

3. The projector of claim 1 wherein the spatial light modulator is a micro-mirror device.

4. The projector of claim 1 wherein the polarization rotator is a liquid crystal device.

5. The projector of claim 1 wherein the first solid-state light source comprises an array of lasers.

6. A stereoscopic digital image projector comprising:
   a) a plurality of light modulation assemblies, each comprising:
   a first solid-state light source energizable to provide illumination having a first polarization axis;
   a second solid-state light source energizable to provide illumination having a second polarization axis orthogonal to the first polarization axis;
   a rotating element disposed in the path of the polarized illumination from both first and second solid-state light sources and actuable to controllably and alternatively direct the light from the first and second solid-state light sources along an optical axis as two temporally alternating orthogonal polarized states of illumination; and
   a micro-electromechanical spatial light modulator in the path of the polarized illumination and energizable to modulate the polarized illumination to form a first modulated light from illumination of the first polarization axis and to form a second modulated light from illumination of the second polarization axis;
   b) a synchronizing means to temporally control the polarization rotation to match the appropriate image data on the spatial light modulator; and
   c) projection optics for directing the first and second modulated light toward a display surface.

7. The projector of claim 6 wherein the first solid-state light source comprises an array of lasers.

8. The projector of claim 6 wherein the spatial light modulator is a micro-mirror device.

9. The projector of claim 6 wherein the rotating element is a segmented disk with at least one reflective and one transmissive segment.

10. The projector of claim 6 wherein the rotating element is imparted with properties that reduce laser speckle.

11. A stereoscopic digital image projector comprising:
    a) a plurality of light modulation assemblies, each comprising:
    a first solid-state light source energizable to provide illumination having a first polarization axis;
    a second solid-state light source energizable to provide illumination having a second polarization axis orthogonal to the first polarization axis;
    a rotating element disposed in the path of the polarized illumination from both first and second solid-state light sources to alternately deliver polarized light from one solid state light source to the illumination section
    a retardation means to rotate the other orthogonally polarized solid-state light source such that its polarization state is matched to the polarization state delivered to the illumination section;
    a redirecting means for delivering this newly matched polarized light to combine at the illumination section;
    an optical integration means for mixing the light of the two solid state light sources without depolarization; and
    a micro-electromechanical spatial light modulator in the path of the polarized illumination and energizable to modulate the polarized illumination to form a first modulated light from illumination of the first polarization axis and to form a second modulated light from illumination of the second polarization axis;
    b) a synchronizing means to temporally control the polarization rotation to match the appropriate image data on the spatial light modulator; and
    c) projection optics for directing the first and second modulated light toward a display surface.

12. The projector of claim 11 wherein the rotating element is a segmented disk with at least one reflective and one transmissive segment.

13. The projector of claim 11 wherein the optical integration means comprises of lenslet arrays.

14. The projector of claim 11 wherein the rotating element is imparted with properties that reduce laser speckle.

15. The projector of claim 11 wherein the first solid-state light source comprises an array of lasers.

16. A stereoscopic digital image projector comprising:
    a) a plurality of light modulation assemblies, each comprising:
    a first solid-state light source energizable to provide illumination having a first polarization axis;
    a second solid-state light source energizable to provide illumination having a second polarization axis orthogonal to the first polarization axis;
    an alternating polarization conversion means to alternately rotate the first or second solid-state light source to the matching polarization state of the other source;
    a delivery means for delivering single polarization state light combined from both solid-state light sources as a single illumination source a preferred orientation to minimize polarization change on a spatial light modulator; and
    a spatial light modulator in the path of the polarized illumination and energizable to modulate the polarized illumination to form a first modulated light from illumination of the first polarization axis and to form a second modulated light from illumination of the second polarization axis;
    b) a synchronizing means to temporally control the polarization rotation to match the appropriate image data on the spatial light modulator; and
    c) projection optics for directing the first and second modulated light toward a display surface.

17. The projector of claim 16 wherein the polarization conversion means is comprised of a segmented rotating disk with at least one reflective and one transmissive segment and a half wave retarder in either the reflective or transmissive paths.

18. The projector of claim 16 wherein the beam delivery path comprises at least one lenslet array.

19. The projector of claim 16 wherein the rotating element is imparted with properties that reduce laser speckle.

20. The projector of claim 16 wherein light combined in the delivery means by a choice of one of the following methods: spatial overlap, angular overlap, or a combination of spatial and angular overlaps.

21. A stereoscopic digital image projector comprising:
    a) a plurality of light modulation assemblies, each comprising:
    at least one solid-state light source energizable to provide illumination having a first polarization axis;

at least one narrow band polarization rotator disposed in the path of the polarized illumination from the solid-state light source(s) and to controllably rotate the polarization axis from the solid-state light source(s) to a second polarized axis in sequence with image data provided to each modulator; and a spatial light modulator in the path of the polarized illumination and energizable to modulate the polarized illumination to form a first modulated light from illumination of the first polarization axis and to form a second modulated light from illumination of the second polarization axis; and b) projection optics for directing the first and second modulated light toward a display surface.

22. The projector of claim 21 wherein two adjacent spectral band solid-state light sources of orthogonal radiation are combined using a polarization beamsplitter and the polarization axis from one of the two adjacent spectral bands is subsequently rotated to match the polarization axis of the other by a color selective retardation means.

23. The projector of claim 21 wherein the spatial light modulator is a micro-mirror device.

24. The projector of claim 21 wherein the polarization rotator is a liquid crystal device.

25. The projector of claim 21 wherein the first solid-state light source comprises an array of lasers.

* * * * *